US011323652B2

(12) United States Patent
Won et al.

(10) Patent No.: US 11,323,652 B2

(45) Date of Patent: May 3, 2022

(54) DISPLAY DEVICE

(71) Applicant: Samsung Display Co., LTD., Yongin-si (KR)

(72) Inventors: Byeong Hee Won, Incheon (KR); Jae Been Lee, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 1 day.

(21) Appl. No.: 16/802,058

(22) Filed: Feb. 26, 2020

(65) Prior Publication Data

US 2020/0404213 A1 Dec. 24, 2020

(30) Foreign Application Priority Data

Jun. 21, 2019 (KR) .................. KR10-2019-0074337

(51) Int. Cl.

| | |
|---|---|
| ***H04N 5/64*** | (2006.01) |
| ***H04R 1/02*** | (2006.01) |
| ***H04R 1/26*** | (2006.01) |
| ***H04R 11/02*** | (2006.01) |
| ***H04R 9/06*** | (2006.01) |
| ***H04R 1/28*** | (2006.01) |

(52) U.S. Cl.

CPC ............. *H04N 5/642* (2013.01); *H04R 1/025* (2013.01); *H04R 1/028* (2013.01); *H04R 1/26* (2013.01); *H04R 1/288* (2013.01); *H04R 9/06* (2013.01); *H04R 11/02* (2013.01); *H04R 2400/03* (2013.01); *H04R 2499/15* (2013.01)

(58) Field of Classification Search

CPC ........ H04N 5/642; H04R 1/025; H04R 1/028; H04R 1/26; H04R 1/288; H04R 9/06; H04R 11/02; H04R 2400/03; H04R 2499/15

See application file for complete search history.

(56) References Cited

U.S. PATENT DOCUMENTS

| | | | | |
|---|---|---|---|---|
| 2017/0280216 | A1* | 9/2017 | Lee | H04R 5/02 |
| 2017/0280246 | A1 | 9/2017 | Choi et al. | |
| 2019/0182585 | A1* | 6/2019 | Quinn | H04R 1/32 |
| 2020/0209674 | A1 | 7/2020 | Won et al. | |
| 2020/0245059 | A1* | 7/2020 | Kim | H04R 1/347 |
| 2020/0333831 | A1* | 10/2020 | Lee | G06F 1/1605 |
| 2020/0358978 | A1* | 11/2020 | Lee | H01L 27/3225 |
| 2021/0105550 | A1* | 4/2021 | You | H04R 1/028 |

FOREIGN PATENT DOCUMENTS

| | | |
|---|---|---|
| KR | 10-2020-0081592 | 7/2020 |

* cited by examiner

*Primary Examiner* — Andrew L Sniezek

(74) *Attorney, Agent, or Firm* — Kile Park Reed & Houtteman PLLC

(57) ABSTRACT

Provided is a display device. The display device includes a display panel including two long sides extending in a first direction and two short sides extending in a second direction, a first sound generator on a first area of one surface of the display panel, the first sound generator outputs a first sound by vibrating the display panel, a second sound generator on a second area of the one surface of the display panel, the second sound generator outputs a second by vibrating the display panel, a bottom frame on the one surface of the display panel, and a first blocking member between the one surface of the display panel and the bottom frame and along edges of the display panel, the first blocking member includes at least one opening.

27 Claims, 17 Drawing Sheets

DISPLAY DEVICE

This application claims priority to and benefits of Korean Patent Application No. 10-2019-0074337 under 35 U.S.C. § 119, filed in the Korean Intellectual Property Office on Jun. 21, 2019, the entire contents of which are incorporated herein by reference.

BACKGROUND

1. Field

The disclosure relates to a display device.

2. Description of the Related Art

As the information society continues to develop, the demand for display devices for displaying images is increasing in various forms. For example, display devices are being applied to various electronic devices such as smartphones, tablet PCs, digital cameras, notebook computers, navigation devices, monitors, and televisions. The display devices may be flat panel display devices such as liquid crystal display devices, field emission display devices, organic light emitting display devices, and quantum dot light emitting display devices.

A display device may include a display panel for displaying an image, a generator for outputting high-pitched sound by vibrating the display panel, and a generator for outputting low-pitched sound by vibrating the display panel. The generator for outputting low-pitched sound causes greater displacement of the display panel than the generator for outputting high-pitched sound. Therefore, visibility and mechanical reliability can be reduced.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Aspects of the disclosure provide a display device which can provide sufficient bass sound while minimizing displacement of a display panel due to vibrations.

However, aspects of the disclosure are not restricted to the one set forth herein. The above and other aspects of the disclosure will become more apparent to one of ordinary skill in the art to which the disclosure pertains by referencing the detailed description of the disclosure given below.

According to one or more embodiments, a display device comprises: a display panel comprising two long sides extending in a first direction and two short sides extending in a second direction, a first sound generator disposed on a first area of one surface of the display panel, the first sound generator outputs a first sound by vibrating the display panel, a second sound generator disposed on a second area of the one surface of the display panel, the second sound generator outputs a second sound by vibrating the display panel, a bottom frame disposed on the one surface of the display panel, and a first blocking member disposed between the one surface of the display panel and the bottom frame and disposed along edges of the display panel, the first blocking member comprises at least one opening.

The first and second directions may intersect each other.

The first and second sound generators may generate sounds in different frequency ranges from each other.

The first sound generator may generate sounds in a low-frequency range and the second sound generator may generate sounds in a high-frequency range.

The first blocking member may comprise a plurality of openings, the openings may be disposed at the two short sides to face each other.

The first sound generator may comprise: a bobbin disposed on the one surface of the display panel, a voice coil which surrounds the bobbin, and a magnet which surrounds the bobbin and spaced apart from the bobbin.

The display device may further comprise a third sound generator disposed on a third area of the one surface of the display panel, the third sound generator outputs a third sound in a higher frequency range than that of the first sound generator by vibrating the display panel.

Each of the second sound generator and the third sound generator may comprise: a first electrode to which a first driving voltage is applied, a second electrode to which a second driving voltage is applied, and a vibration layer disposed between the first electrode and the second electrode, the vibration layer has a piezoelectric material that contracts or expands according to the first driving voltage applied to the first electrode and the second driving voltage applied to the second electrode.

The display device may further comprise a second blocking member and a third blocking member which form an air duct that guides sound waves output backward from the first through third areas of the display panel to be output to an outside of the display device through the openings.

The display device may further comprise a lower set cover under the bottom frame, wherein the low-frequency sound from the first sound generator and the high-frequency sounds from the second and third sound generators are output forward from the display panel through spaces between side surfaces of the lower set cover and side surfaces of the display panel.

The second blocking member may surround the first sound generator and may comprise a first section which is spaced apart from an upper side of the first sound generator by a predetermined distance, a second section which is spaced apart from both sides of the first sound generator by a predetermined distance, and a third section which extends from the second section toward the openings.

The third blocking member may extend along an extending direction of the long sides and may be disposed near lower ends of the second area and the third area.

The second blocking member and the third blocking member may be spaced apart from each other, and both ends of the third blocking member may be connected to the first blocking member.

According to one or more embodiments, a display device comprises: a display panel comprising two long sides extending in a first direction and two short sides extending in a second direction, a first sound generator disposed on a first area of one surface of the display panel, the first sound generator outputs a first sound by vibrating the display panel, a second sound generator disposed on a second area of the one surface of the display panel, the second sound generator outputs a second sound by vibrating the display panel, a bottom frame disposed on the one surface of the display panel, and a first blocking member disposed between the one surface of the display panel and the bottom frame and disposed along edges of the display panel, the first blocking member comprises at least one opening.

The second direction may intersect the first direction.

The second sound generator may output a second sound in the same frequency range as the first sound generator.

The first sound generator and the second sound generator may generate sounds in a low-frequency range.

Each of the first sound generator and the second sound generator may comprises: a first electrode to which a first driving voltage is applied, a second electrode to which a second driving voltage is applied, and a vibration layer disposed between the first electrode and the second electrode and the vibration layer has a piezoelectric material that contracts or expands according to the first driving voltage applied to the first electrode and the second driving voltage applied to the second electrode.

At least one bass enhancing thin film may be provided between the display panel and the bottom frame.

One surface of the first and second sound generators may be attached to the one surface of the display panel, and the other surface of the first and second sound generators may be attached to one surface of the bass enhancing thin-film.

The other surface of the bass enhancing thin film which is opposite the one surface attached to the other surfaces of the first and second sound generators may be spaced apart from the bottom frame in a thickness direction.

The bass enhancing thin film may be made of polyvinylidene fluoride (PVDF).

The display device may further comprise a second blocking member and a third blocking member that form an air duct that guides sound waves output backward from the first and second areas of the display panel to be output to an outside of the display device through the at least one opening.

The second blocking member may be disposed in the middle of the display panel in an extending direction of the long sides and may extend in an extending direction of the short sides.

The third blocking member may comprise a plurality of sub-blocking members arranged at regular intervals in the extending direction of the short sides, the sub-blocking members may extend in a first diagonal direction and a second diagonal direction which are directions between the extending direction of the short sides and the extending direction of the long sides.

First through fifth sub-blocking members may extend in the first diagonal direction, and sixth through tenth sub-blocking members may extend in the second diagonal direction.

One end of the first, second, third, fourth, fifth, sixth, seventh, eighth, ninth, and tenth sub-blocking member may be connected to the second blocking member and the other end of the first, second, third, fourth, fifth, sixth, seventh, eighth, ninth, and tenth sub-blocking member may be spaced apart from the first blocking member and one ends of either of first, second, third, fourth, fifth, sixth, seventh, eighth, ninth, or tenth sub-blocking member may be adjacent to the opening.

First through fifth sub-blocking members may extend in the first diagonal direction, and sixth through tenth sub-blocking members may extend in the second diagonal direction, one ends of the first sub-blocking member and the second sub-blocking members may be adjacent to the opening, the other end of the first sub-blocking member may be connected to the second blocking member, the other end of the second sub-blocking member may be spaced apart from the second blocking member, one end of the third sub-blocking member may be connected to the second blocking member, the other end of the third sub-blocking member may be spaced apart from the first blocking member, one end of the fourth sub-blocking member may be connected to the first blocking member, the other end of the fourth sub-blocking member may be spaced apart from the second blocking member, one end of the fifth sub-blocking member may be connected to the second blocking member, the other end of the fifth sub-blocking member may be spaced apart from the first blocking member, one ends of the sixth sub-blocking member and the seventh sub-blocking member may be adjacent to the opening, the other end of the sixth sub-blocking member may be connected to the second blocking member, the other end of the seventh sub-blocking member may be spaced apart from the second blocking member, one end of the eighth sub-blocking member may be connected to the second blocking member, the other end of the eighth sub-blocking member may be spaced apart from the first blocking member, one end of the ninth sub-blocking member may be connected to the first blocking member, the other end of the ninth sub-blocking member may be spaced apart from the second blocking member, one end of the tenth sub-blocking member may be connected to the second blocking member, and the other end of the tenth sub-blocking member may be spaced apart from the first blocking member.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE EMBODIMENTS

Figure 1:
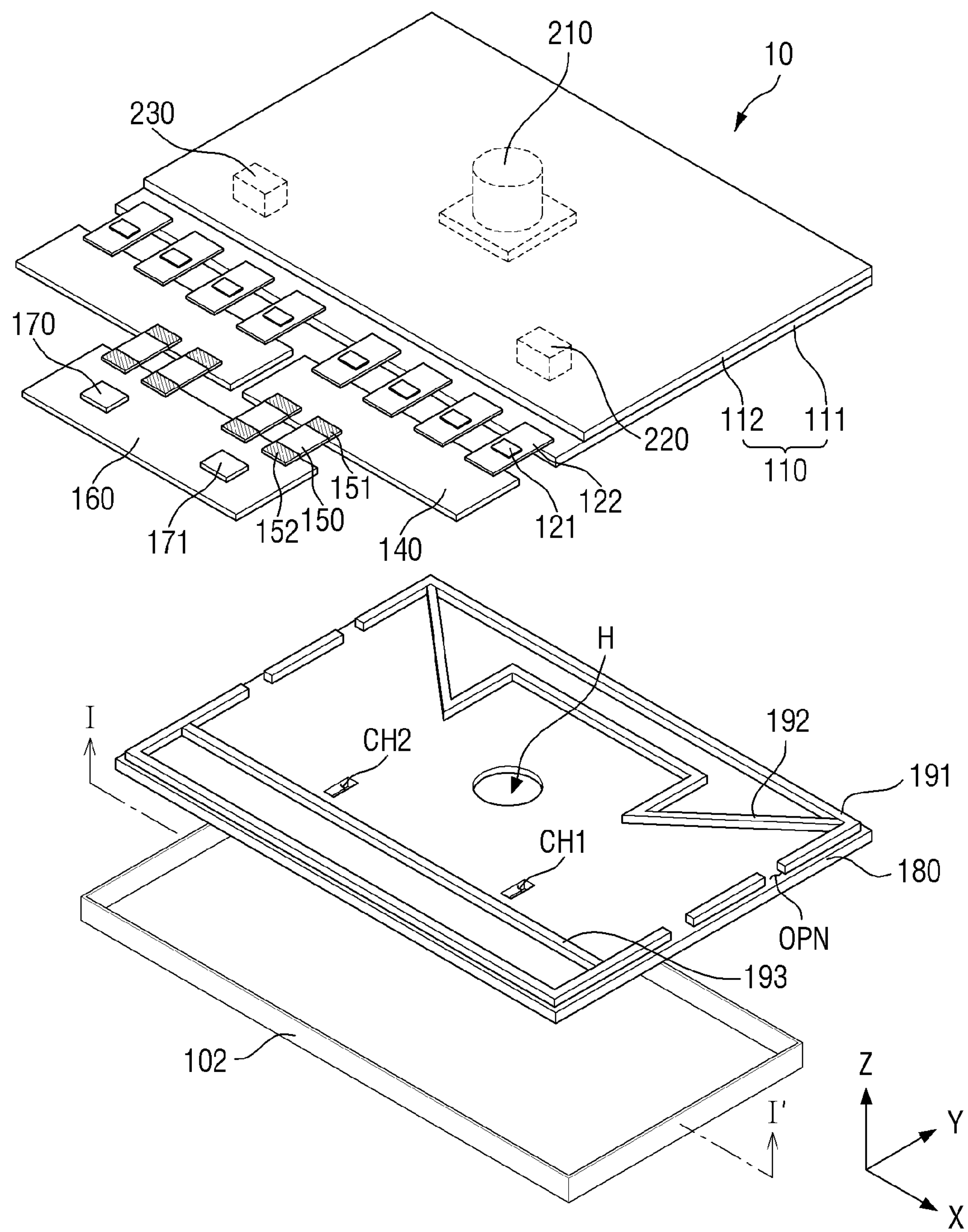
FIG. 1 is an exploded perspective view of a display device according to an embodiment.

Embodiments of the invention will be described hereinafter with reference to the accompanying drawings. Although the invention may be modified in various manners and have additional embodiments, embodiments are illustrated in the accompanying drawings and will be mainly described in the specification. However, the scope of the invention is not limited to the embodiments in the accompanying drawings and the specification and should be construed as including all the changes, equivalents and substitutions included in the spirit and scope of the invention.

Some of the parts which are not associated with the description may not be provided in order to describe embodiments of the invention and like reference numerals refer to like elements throughout the specification.

In the drawings, sizes and thicknesses of elements may be enlarged for clarity and ease of description thereof. However, the invention is not limited to the illustrated sizes and thicknesses. In the drawings, the thicknesses of layers, films, panels, regions, and other elements may be exaggerated for clarity. In the drawings, for better understanding and ease of description, the thicknesses of some layers and areas may be exaggerated.

Further, in the specification, the phrase "in a plan view" means when an object portion is viewed from above, and the phrase "in a schematic cross-sectional view" means when a schematic cross-section taken by vertically cutting an object portion is viewed from the side.

When a layer, film, region, substrate, or area, is referred to as being "on" another layer, film, region, substrate, or area, it may be directly on the other film, region, substrate, or area, or intervening films, regions, substrates, or areas, may be present therebetween. Conversely, when a layer, film, region, substrate, or area, is referred to as being "directly on" another layer, film, region, substrate, or area, intervening layers, films, regions, substrates, or areas, may be absent therebetween. Further when a layer, film, region, substrate, or area, is referred to as being "below" another layer, film, region, substrate, or area, it may be directly below the other layer, film, region, substrate, or area, or intervening layers, films, regions, substrates, or areas, may be present therebetween. Conversely, when a layer, film, region, substrate, or area, is referred to as being "directly below" another layer, film, region, substrate, or area, intervening layers, films, regions, substrates, or areas, may be absent therebetween. Further, "over" or "on" may include positioning on or below an object and does not necessarily imply a direction based upon gravity.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

Throughout the specification, when an element is referred to as being "connected" to another element, the element may be "directly connected" to another element, or "electrically connected" to another element with one or more intervening elements interposed therebetween.

It will be further understood that when the terms "comprises," "comprising," "includes" and/or "including" are used in this specification, they or it may specify the presence of stated features, integers, steps, operations, elements and/or components, but do not preclude the presence or addition of other features, integers, steps, operations, elements, components, and/or any combination thereof.

It will be understood that, although the terms "first," "second," "third," or the like may be used herein to describe various elements, these elements should not be limited by these terms. These terms are used to distinguish one element from another element or for the convenience of description and explanation thereof. For example, when "a first element" is discussed in the description, it may be termed "a second element" or "a third element," and "a second element" and "a third element" may be termed in a similar manner without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

FIG. 1 is an exploded perspective view of a display device 10 according to an embodiment.

Referring to FIG. 1, the display device 10 according to the embodiment may include a lower set cover 102, a display panel 110, source driving circuits 121, flexible films 122, a heat dissipation film 130, source circuit boards 140, first cables 150, a control circuit board 160, a timing control circuit 170, a bottom frame 180, a first sound generator 210, a second sound generator 220, and a third sound generator 230.

In the specification, the terms "above", "top" and "upper surface" indicate a direction in which a second substrate 112 is disposed with respect to a first substrate 111 of the display panel 110, that is, a third direction (Z-axis direction), and the terms "below," "bottom" and "lower surface" indicate a direction in which the heat dissipation film 130 is disposed with respect to the first substrate 111 of the display panel 110, that is, a direction opposite to the third direction (Z-axis direction). For example, "left," "right," "upper" and "lower" indicate directions when the display panel 110 is viewed in plan view. For example, "left" indicates a first direction (X-axis direction), "right" indicates a direction opposite to the first direction (X-axis direction), "upper" indicates a second direction (Y-axis direction), and "lower" indicates a direction opposite to the second direction (Y-axis direction).

The lower set cover 102 may be disposed under the bottom frame 180. When the source circuit boards 140, the first cables 150, and the control circuit board 160 are disposed under the display panel 110 due to the bending of the flexible films 122, the lower set cover 102 may cover the source circuit boards 140, the first cables 150, and the control circuit board 160. In FIG. 1, a length of the lower set cover 102 in the second direction (Y-axis direction) may be smaller than a length of the bottom frame 180 in the second direction (Y-axis direction). However, embodiments are not limited, and the length of the lower set cover 102 in the second direction (Y-axis direction) may also be greater than or substantially equal to the length of the bottom frame 180 in the second direction (Y-axis direction). The lower set cover 102 may be made of plastic or metal or may include both plastic and metal, for example.

The display panel 110 may be rectangular in plan view. For example, the display panel 110 may have a rectangular planar shape having long sides in the first direction (X-axis direction) and short sides in the second direction (Y-axis direction) as illustrated in FIG. 1. Each corner where a long side extending in the first direction (X-axis direction) meets a short side extending in the second direction (Y-axis direction) may be right-angled or may be rounded with a predetermined curvature. The planar shape of the display panel 110 is not limited to the rectangular shape, but may also be another polygonal shape, a circular shape or an elliptical shape.

Although the display panel 110 is illustrated as being flat, embodiments are not limited thereto. The display panel 110 may also include a curve, or curved portion bent with a predetermined curvature.

The display panel 110 may include the first substrate 111 and the second substrate 112. The second substrate 112 may be placed to face a first surface of the first substrate 111. The first substrate 111 and the second substrate 112 may be rigid or flexible. The first substrate 111 may be made of glass or plastic. The second substrate 112 may be made of glass, plastic, an encapsulation film, or a barrier film. The second substrate 112 may be omitted. When the first substrate 111 and the second substrate 112 are made of plastic, the plastic may be polyethersulfone (PES), polyacrylate (PA), polyarylate (PAR), polyetherimide (PEI), polyethylene naphthalate (PEN), polyethylene terepthalate (PET), polyphenylene sulfide (PPS), polyallylate, polyimide (PI), polycarbonate (PC), cellulose triacetate (CAT), cellulose acetate propionate (CAP), or a combination of these materials. The encapsulation film or the barrier film may be a film in which inorganic layers may be stacked.

The display panel 110 may be an organic light emitting display panel using an organic light emitting diode including a first electrode, an organic light emitting layer and a second electrode, an inorganic light emitting display panel using an inorganic light emitting diode including a first electrode, an inorganic semiconductor layer and a second electrode, or a quantum dot light emitting display panel including a quantum dot light emitting diode including a first electrode, a quantum dot light emitting layer and a second electrode.

Figure 7:
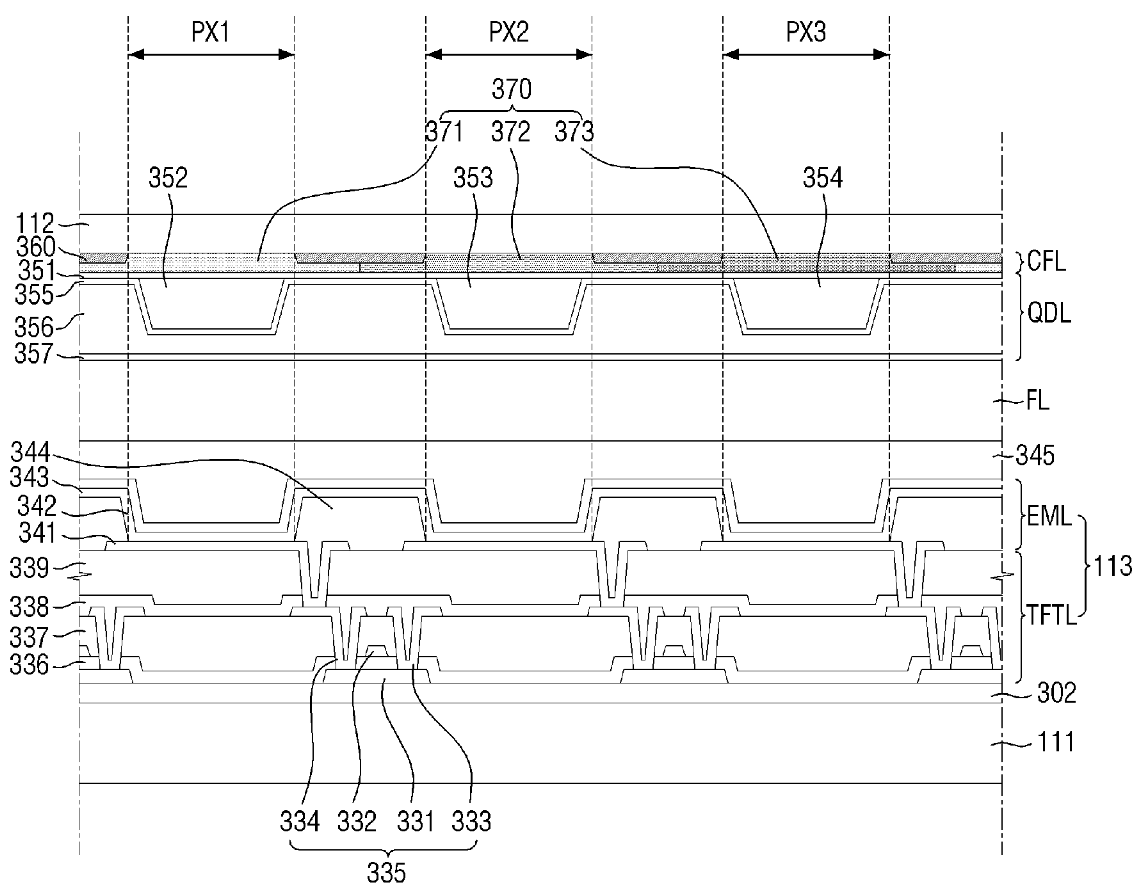
FIG. 7 is a schematic cross-sectional view of an example of a first substrate, a second substrate, and a pixel array layer of the display panel.

The display panel 110 is described below as an organic light emitting display panel including a thin-film transistor layer TFTL, a light emitting element layer EML, a filler FL, a light conversion layer QDL, and a color filter layer CFL between the first substrate 111 and the second substrate 112 as illustrated in FIG. 7. For example, the first substrate 111 may be a thin-film transistor substrate on which the thin-film transistor layer TFTL, the light emitting element layer EML and an encapsulation film 345 may be formed, the second substrate 112 may be a color filter substrate on which the light wavelength conversion layer QDL and the color filter layer CFL are formed, and the filler FL may be disposed between the encapsulation film 345 of the first substrate 111 and the light wavelength conversion layer QDL of the second substrate 112.

The second substrate 112 of the display panel 110 may be omitted, and a thin-film encapsulation layer may be disposed on the light emitting element layer EML. The filler FL may be omitted, and the light conversion layer QDL and the color filter layer CFL may be disposed on the thin-film encapsulation layer.

A side of each of the flexible films 122 may be disposed on the first surface of the first substrate 111 of the display panel 110, and the other side may be attached onto one surface of one of the source circuit boards 140. For example, since the first substrate 111 may be larger in size than the second substrate 112, a side of the first substrate 111 may be exposed without being covered by the second substrate 112. The flexible films 122 may be attached to the exposed side of the first substrate 111 which is not covered by the second substrate 112. Each of the flexible films 122 may be attached onto the first surface of the first substrate 111 and the one surface of one of the source circuit boards 140 by using an anisotropic conductive film.

Figure 4:
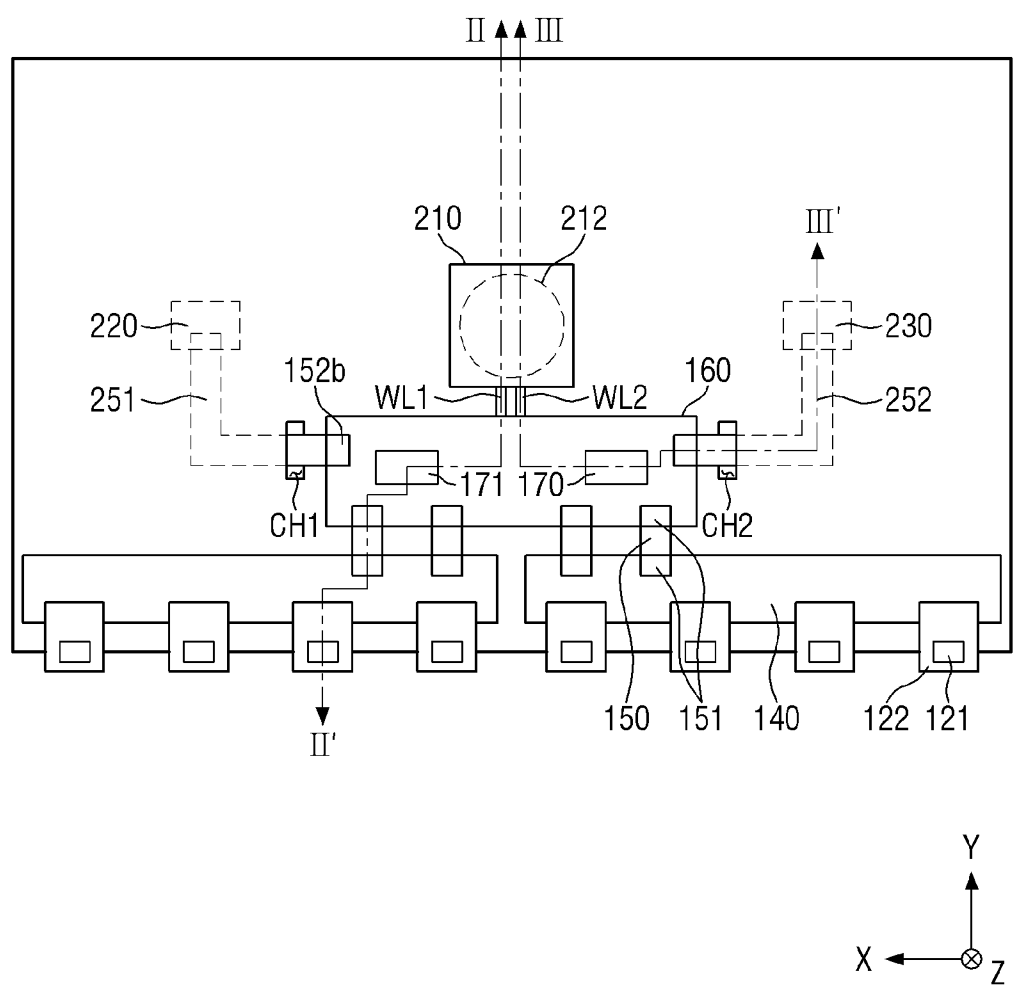
FIG. 4 is a bottom view illustrating an example of the display panel coupled to a bottom frame when the flexible films are bent toward the bottom of the bottom frame in FIG. 1.
Figure 5:
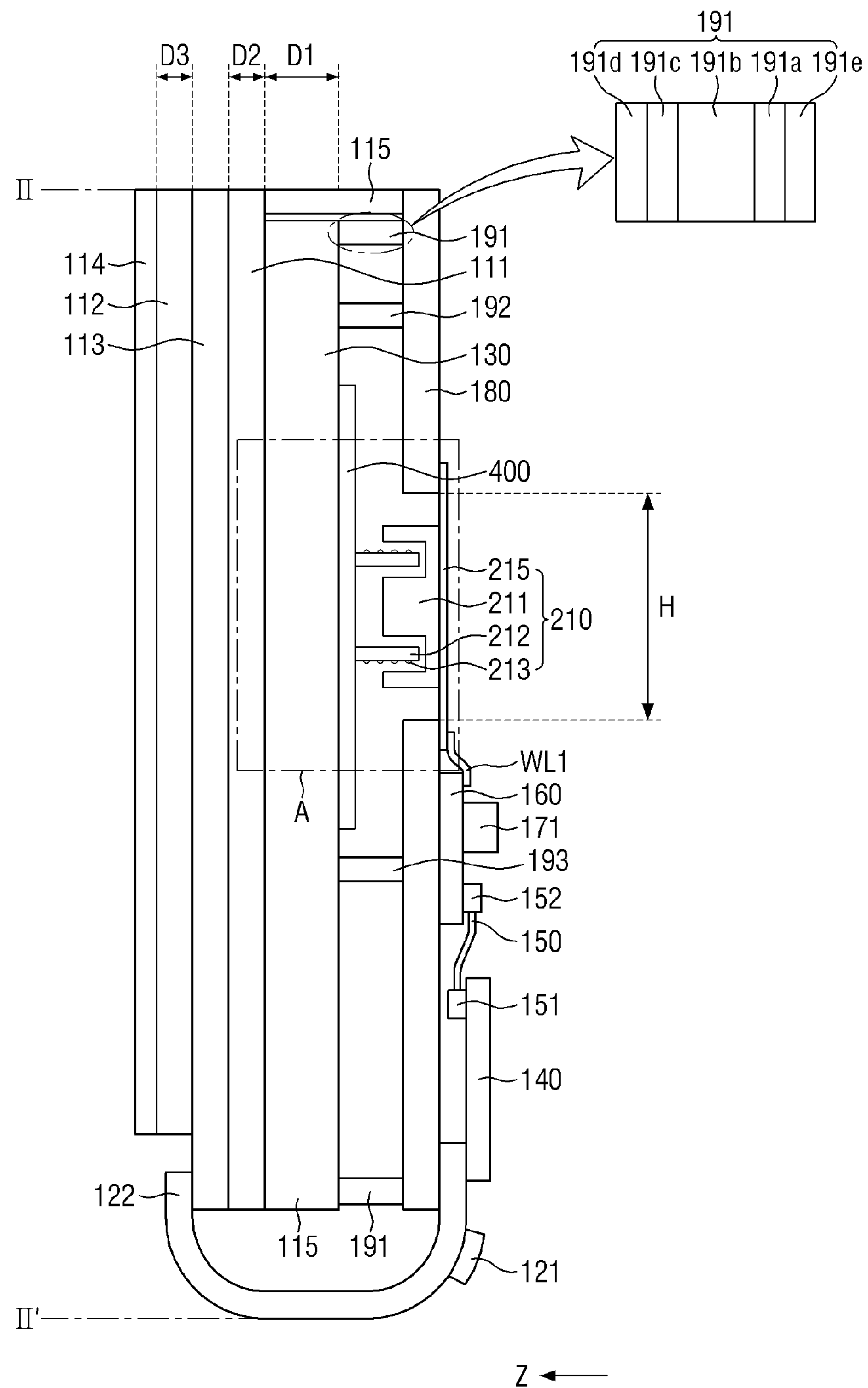
FIG. 5 is a schematic cross-sectional view of an example of II-II' of FIG. 4.
Figure 6:
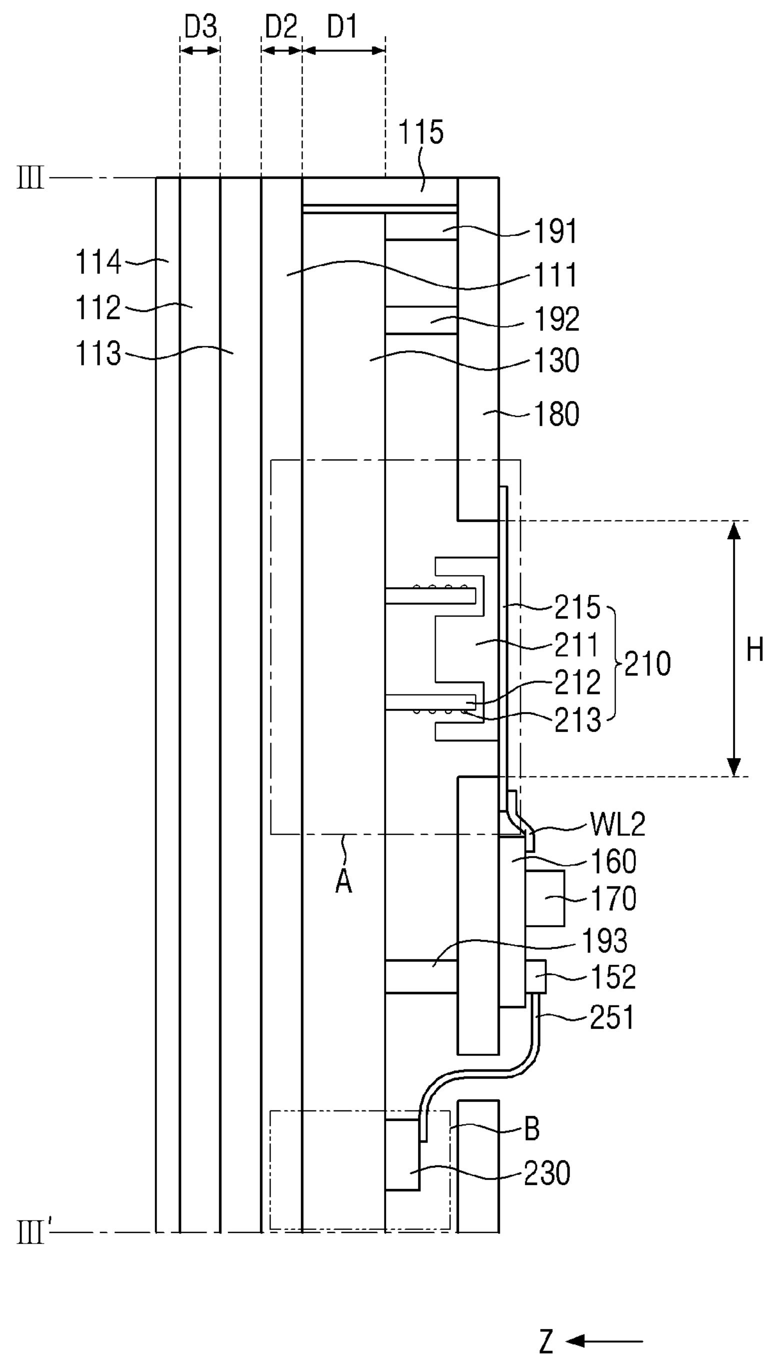
FIG. 6 is a schematic cross-sectional view of an example of III-III' of FIG. 4.

Each of the flexible films 122 may be a flexible film such as a tape carrier package or a chip on film. The flexible films 122 may be bent toward the bottom of the first substrate 111 as illustrated in FIGS. 4, 5 and 6. The source circuit boards 140, the first cables 150, and the control circuit board 160 may be disposed on a lower surface of the bottom frame 180. Although eight flexible films 122 are attached onto the first substrate 111 of the display panel 110 in FIG. 1, the number of the flexible films 122 is not limited to eight and may include any number of flexible films 122.

The source driving circuits 121 may be disposed on surfaces of the flexible films 122, respectively. The source driving circuits 121 may be formed as integrated circuits. Each of the source driving circuits 121 converts digital video data into analog data voltages according to a source control signal of the timing control circuit 170 and supplies the analog data voltages to data lines of the display panel 110 through a flexible film 122.

Each of the source circuit boards 140 may be connected to the control circuit board 160 by the first cables 150. Each of the source circuit boards 140 may include first connectors 151 for connection to the first cables 150. The source circuit boards 140 may be flexible printed circuit boards or printed circuit boards. The first cables 150 may be flexible cables.

The control circuit board 160 may be connected to the source circuit boards 140 via the first cables 150. To this end, the control circuit board 160 may include second connectors 152 for connection to the first cables 150. The control circuit board 160 may be fixed onto the other surface of the bottom frame 180 by fixing members such as screws. The fixing members may be any material or object for securing the various elements as would be appreciated and understood by those of ordinary skill in the art. The control circuit board 160 may be a flexible printed circuit board or a printed circuit board.

Although four first cables 150 connect the source circuit boards 140 and the control circuit board 160 in FIG. 1, the number of the first cables 150 is not limited to four and may be any suitable number. Although two source circuit boards 140 are illustrated in FIG. 1, the number of the source circuit boards 140 is not limited to two and may be any suitable number.

Alternatively, when the number of the flexible films 122 is small, the source circuit boards 140 may be omitted. The flexible films 122 may be directly connected to the control circuit board 160.

The timing control circuit 170 may be disposed on one surface of the control circuit board 160. The timing control circuit 170 may be formed as an integrated circuit. The timing control circuit 170 may receive digital video data and timing signals from a system on chip of a system circuit board and generate a source control signal for controlling the timings of the source driving circuits 121 according to the timing signals.

A sound driving circuit 171 may be disposed on the one surface of the control circuit board 160. The sound driving circuit 171 may be formed as an integrated circuit. The sound driving circuit 171 may receive sound data from the system circuit board. The sound driving circuit 171 may convert sound data, which is digital data, into a first sound signal, a second sound signal and a third sound signal which are analog signals. The sound driving circuit 171 may output the first sound signal to the first sound generator 210, the second sound signal to the second sound generator 220, and the third sound signal to the third sound generator 230.

The system on chip may be mounted on the system circuit board connected to the control circuit board 160 via a flexible cable and may be formed as an integrated circuit. The system on chip may be a processor of a smart television, a central processing unit (CPU) or graphics card of a computer or notebook, or an application processor of a smartphone or tablet PC. The system circuit board may be a flexible printed circuit board or a printed circuit board.

A power supply circuit may be attached onto the one surface of the control circuit board 160. The power supply circuit may generate voltages necessary for driving the display panel 110 from main power received from the system circuit board and supply the generated voltages to the display panel 110. For example, the power supply circuit may generate a high-potential voltage, a low-potential voltage and an initialization voltage for driving organic light emitting elements and supply the generated voltages to the display panel 110. The power supply circuit may generate driving voltages for driving the source driving circuits 121, the timing control circuit 170, etc. and supply the generated voltages. The power supply circuit may be formed as an integrated circuit. The power supply circuit may be disposed on a power circuit board formed separately from the control circuit board 160. The power circuit board may be a flexible printed circuit board or a printed circuit board.

The first sound generator 210, the second sound generator 220, and the third sound generator 230 may be disposed on a second surface which is opposite the first surface of the first substrate 111. The first sound generator 210 may be a vibration device capable of vibrating the display panel 110 in the third direction (Z-axis direction) according to the first sound signal of the sound driving circuit 171. The second sound generator 220 may be a vibration device capable of vibrating the display panel 110 in the third direction (Z-axis direction) according to the second sound signal of the sound driving circuit 171. The third sound generator 230 may be a vibration device capable of vibrating the display panel 110 in the third direction (Z-axis direction) according to the third sound signal of the sound driving circuit 171.

Figure 8:
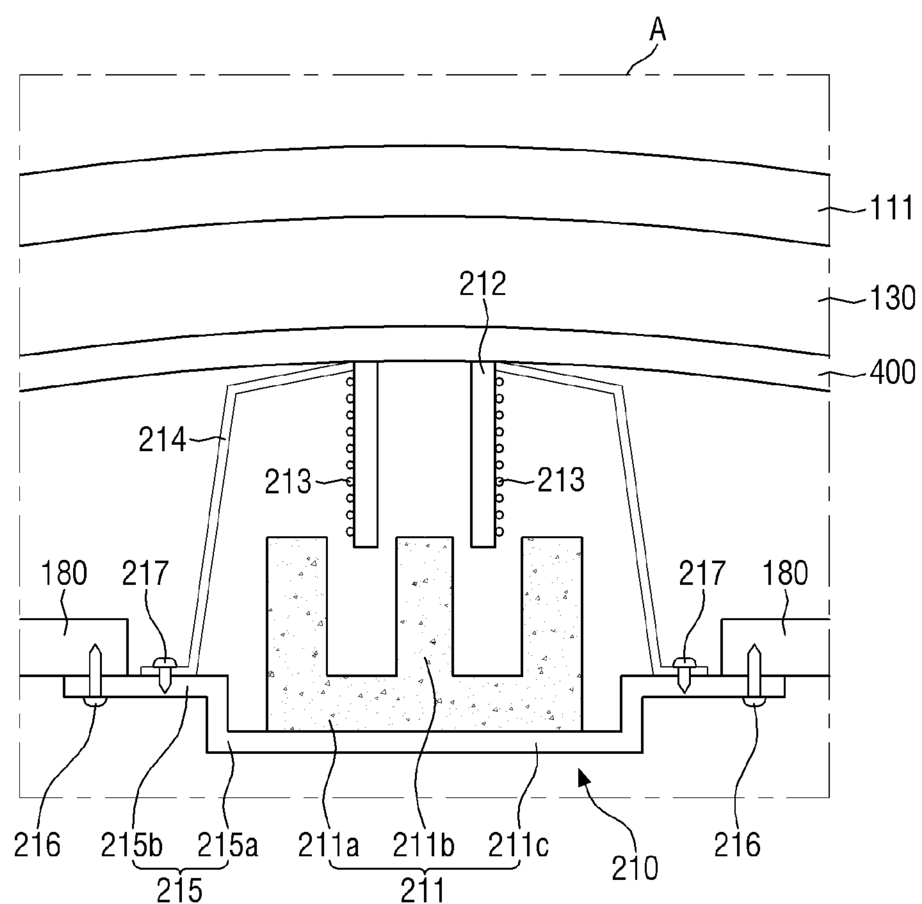
FIGS. 8 and 9 illustrate the vibration of the display panel caused by a first sound generator.
Figure 9:
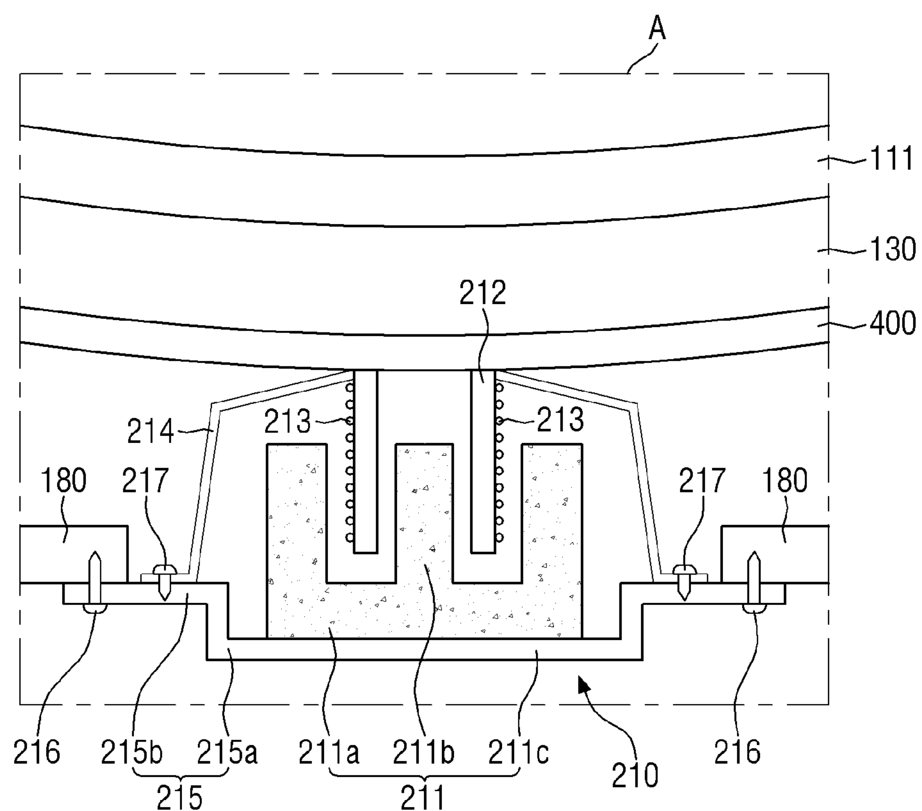
Figure 10:
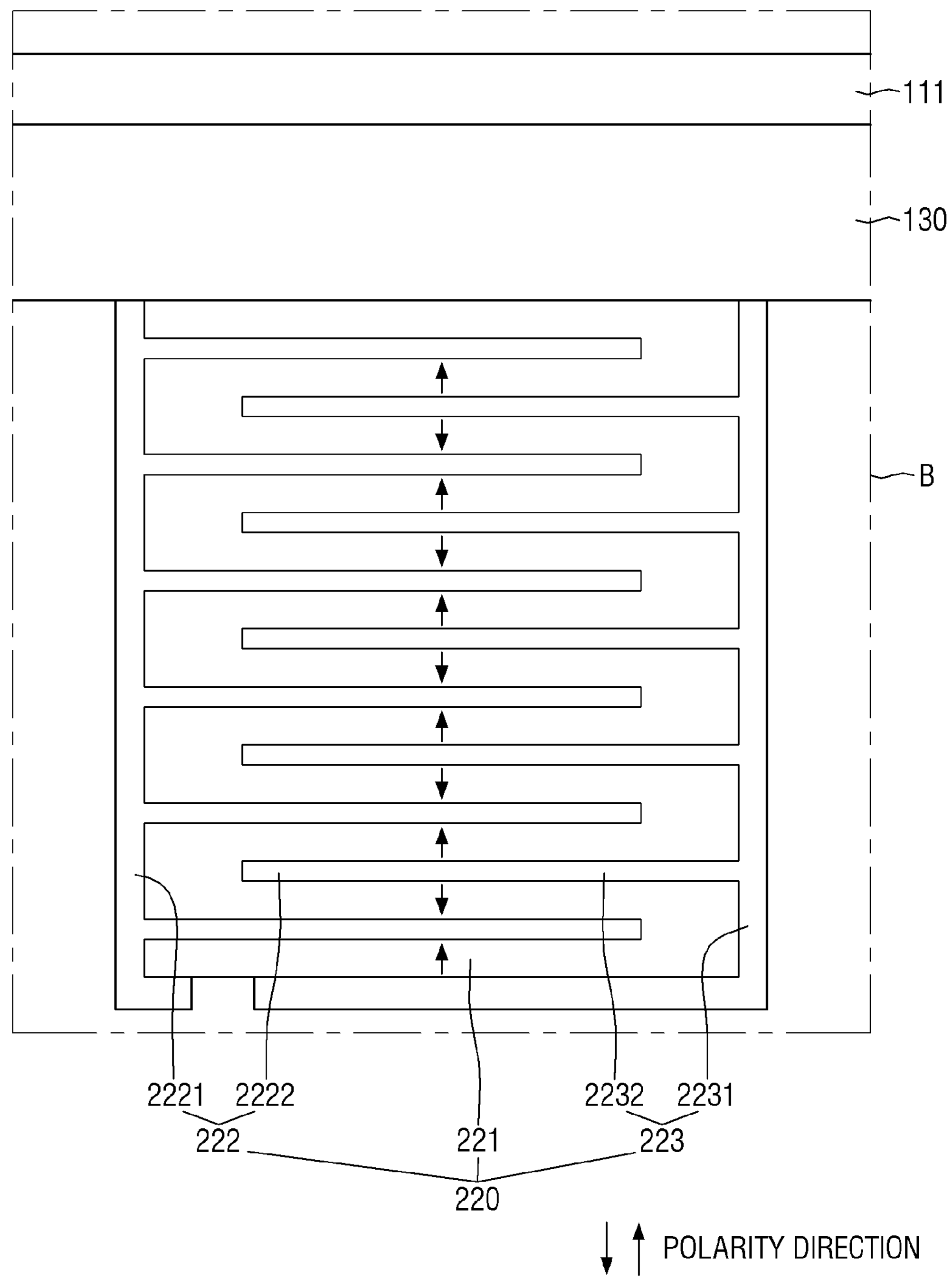
FIG. 10 illustrates the vibration of the display panel caused by second and third sound generators.
Figure 11:
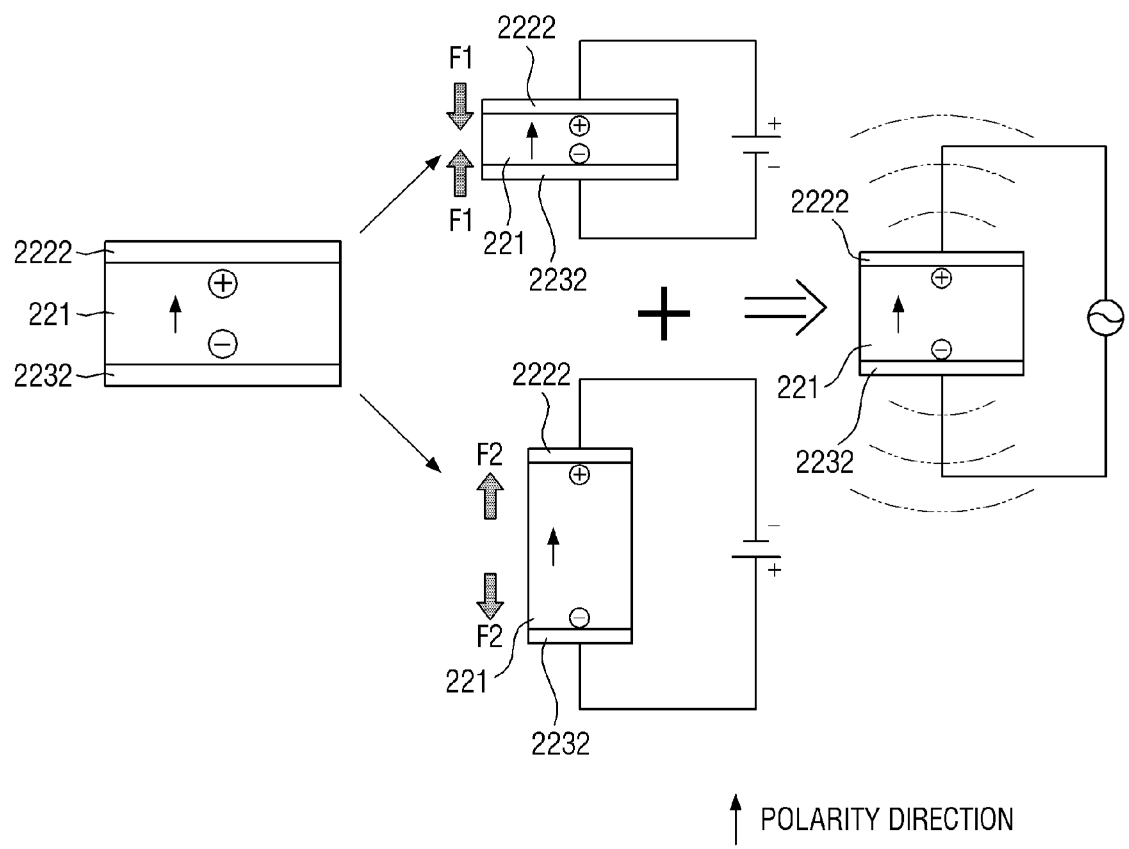
FIG. 11 illustrates a method of vibrating a vibration layer disposed between a first branch electrode and a second branch electrode of each of the second and third sound generators.

The first sound generator 210 may be an exciter that vibrates the display panel 110 by generating a magnetic force using a voice coil 213 as illustrated in FIGS. 8 and 9. Each of the second sound generator 220 and the third sound generator 230 may be a piezoelectric element or a piezoelectric actuator that vibrates the display panel 110 using a piezoelectric material that contracts or expands according to an applied voltage as illustrated in FIGS. 10 and 11.

The first sound generator 210 may serve as a low-frequency sound generator that outputs low-frequency sounds, and the second sound generator 220 may serve as a high-frequency sound generator that outputs high-frequency sounds. The third sound generator 230 may serve as a high-frequency sound generator that outputs high-frequency sounds. A low-frequency sound may be, but is not limited to, a sound in a low-frequency range of about 800 MHz or less, and a high-frequency sound may be, but is not limited to, a sound in a higher frequency range than about 800 MHz. When a low-frequency sound is a sound in a low-frequency range of about 800 MHz or less, it may contain both low and mid sounds.

The bottom frame 180 may be disposed on a second surface of the first substrate 111. A hole H in which the first sound generator 210 may be disposed may be formed in an area of the bottom frame 180 which corresponds to the first sound generator 210. A first cable hole CH1 through which a first sound circuit board 251 connecting the control circuit board 160 and the second sound generator 220 and a second cable hole CH2 through which a second sound circuit board 252 connecting the control circuit board 160 and the third sound generator 230 passes may be formed in the bottom frame 180 as illustrated in FIG. 4. The bottom frame 180 may be metal or tempered glass, by way of example.

First through third blocking members 191 through 193 may be disposed on the bottom frame 180. The first through third blocking members 191 through 193 will be described in detail later with reference to FIG. 4.

As described above, the display device 10 illustrated in FIG. 1 may output low-frequency sound using the display panel 110 as a diaphragm through the first sound generator 210 and output high-frequency sound using the display panel 110 as a diaphragm through the second sound generator 220 and the third sound generator 230. For example, since high-frequency sound and low-frequency sound can be output forward from the display device 10, sound quality can be improved.

Figure 2:
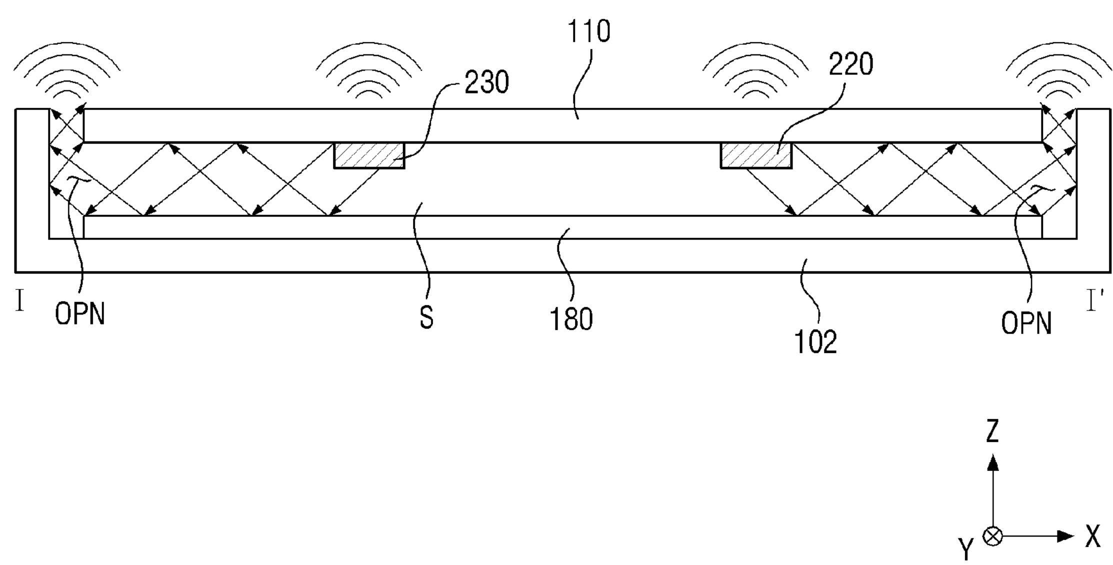
FIG. 2 is a schematic cross-sectional view of an example of I-I' of FIG. 1.

Although the display device 10 according to the embodiment is illustrated as a medium/large display device including source driving circuits 121 in FIGS. 1 and 2, embodiments are not limited thereto. For example, the display device 10 according to the embodiment may also be a small display device including one source driving circuit 121. When the display device is a small display device, the flexible films 122, the source circuit boards 140, and the first cables 150 may be omitted. The source driving circuits 121 and the timing control circuit 170 may be integrated into one integrated circuit and then attached onto one flexible circuit board or attached onto the first substrate 111 of the display panel 110. Examples of the medium/large display device may include monitors and televisions, and examples of the small display device may include smartphones and tablet PCs.

Although not illustrated in the drawing, the display device 10 may include an upper set cover. The upper set cover may cover edges of an upper surface of the display panel 110. The upper set cover may cover a non-display area excluding a display area of the display panel 110. When the display device 10 includes the upper set cover, a thin grille made of fiber or metal may be formed in each area overlapping an opening OPN, which will be described later, in the third direction (Z-axis direction).

The term overlap may include layer, stack, face or facing, extending over, covering or partly covering or any other suitable term as would be appreciated and understood by those of ordinary skill in the art.

The terms 'do not overlap' may include 'apart from' or 'set aside from' or 'offset from' and any other suitable equivalents as would be appreciated and understood by those of ordinary skill in the art.

FIG. 2 is a schematic cross-sectional view of an example of I-I' of FIG. 1.

Referring to FIGS. 1 and 2, when the first through third blocking members 191 through 193 are disposed between the display panel 110 and the bottom frame 180, the display device 10 may include an empty cuboid space "S" formed by a back surface of the display panel 110, one surface of the bottom frame 180 which faces the back surface, and inner side surfaces of the first blocking member 191. The empty cuboid space may be a cavity, chamber, or aperture, for example, and is not limited to that of cuboid.

The first sound generator 210, the second sound generator 220, and the third sound generator 230 may be disposed on the second surface of the first substrate 111 which is opposite the first surface of the first substrate 111. The first sound generator 210, the second sound generator 220, and the third sound generator 230 may reciprocate in the third direction (Z-axis direction), thereby vibrating the display panel 110.

Therefore, a low-frequency sound generated by the first sound generator 210 and a high-frequency sound generated by the second sound generator 220 and the third sound generator 230 may be output forward from the display panel 110.

For example, the first sound generator 210, the second sound generator 220, and the third sound generator 230 may also output low-frequency and high-frequency sounds backward from the display panel 110. These sounds may be reflected in the empty cuboid space "S" and then output through the openings OPN as illustrated in FIG. 2 which will be described later. The low-frequency and high-frequency sounds output backward from the display panel 110 may have phases opposite to those of the low-frequency and high-frequency sounds output forward from the display panel 110.

The low-frequency and high-frequency sounds output through the openings OPN may be output forward from the display panel 110 through spaces between side surfaces of the lower set cover 102 and side surfaces of the display panel 110. The low-frequency and high-frequency sounds output through the spaces between the side surfaces of the lower set cover 102 and the side surfaces of the display panel 110 may be made to have the same phase as the low-frequency and high-frequency sounds output forward from the display panel 110 in the process of passing through an air duct formed by the second and third blocking members 192 and 193 and may be amplified to further enhance bass sound.

The exemplary shape of the air duct formed by the first through third blocking members 191 through 193 will now be described with reference to FIG. 3.

Figure 3:
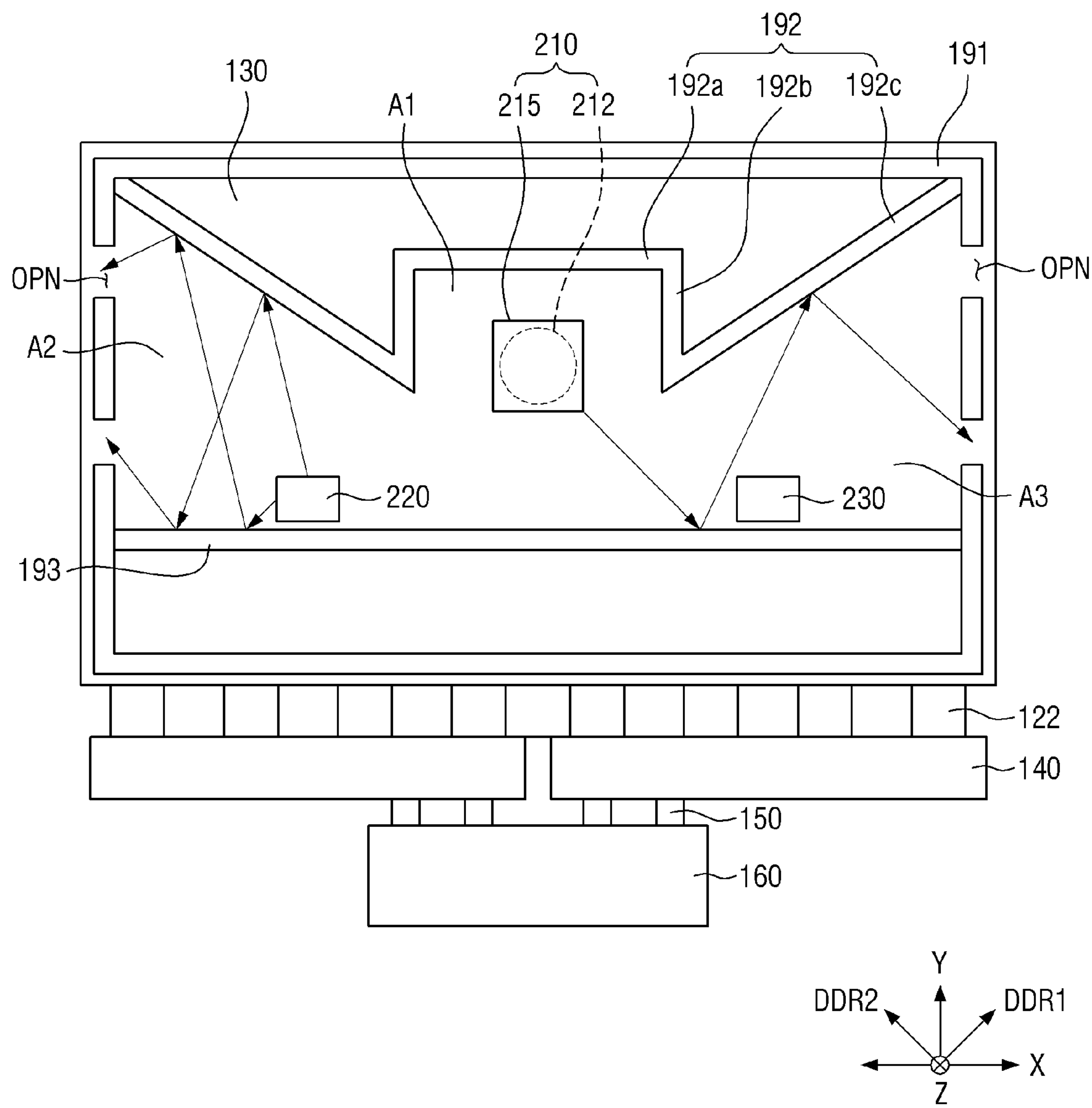
FIG. 3 is a bottom view illustrating an example of a display panel when flexible films are unfolded in FIG. 1.

FIG. 3 is a bottom view illustrating an example of the display panel 110 when the flexible films 122 are unfolded in FIG. 1. FIG. 4 is a bottom view illustrating an example of the display panel 110 coupled to the bottom frame 180 when the flexible films 122 are bent toward the bottom of the bottom frame 180 in FIG. 1. FIG. 5 is a schematic cross-sectional view of an example of II-II' of FIG. 4. FIG. 6 is a schematic cross-sectional view of an example of III-III' of FIG. 4.

Referring to FIGS. 3 through 6, the first surface of the first substrate 111 and a first surface of the second substrate 112 may face each other. A pixel array layer 113 may be disposed between the first surface of the first substrate 111 and the first surface of the second substrate 112. The pixel array layer 113 may include pixels PX1 through PX3 which emit light as illustrated in FIG. 7. The pixel array layer 113 will be described in detail later with reference to FIG. 7.

The heat dissipation film 130 may be disposed on the second surface of the first substrate 111. The first sound generator 210 may be disposed on one surface of the heat dissipation film 130. The heat dissipation film 130 dissipates heat generated by the first sound generator 210. To this end, the heat dissipation film 130 may include a metal layer having high thermal conductivity, such as graphite, silver (Ag), copper (Cu) or aluminum (Al).

The heat dissipation film 130 may include graphite layers or metal layers formed in the first direction (X-axis direction) and the second direction (Y-direction). For example, since the heat generated by the first sound generator 210 can be diffused in the first direction (X-axis direction) and the second direction (Y-axis direction), heat may be released more effectively. Therefore, the heat dissipation film 130 may minimize the effect of the heat generated by the first sound generator 210 on the display panel 110. For example, in order to further reduce the effect of the heat generated by the first sound generator 210 on the display panel 110, a thickness D1 of the heat dissipation film 130 may be greater than a thickness D2 of the first substrate 111 and a thickness D3 of the second substrate 112 as illustrated in FIGS. 5 and 6. In the specification, the first direction (X-axis direction) may be a width direction of the display panel 110, the second direction (Y-axis direction) may be a height direction of the display panel 110, and the third direction (Z-axis direction) may be a thickness direction of the display panel 110.

The heat dissipation film 130 may be substantially smaller in size than the first substrate 111. Therefore, edges of a surface of the first substrate 111 may be exposed without being covered by the heat dissipation film 130.

The heat dissipation film 130 may be omitted. Elements disposed on the one surface of the heat dissipation film 130 may be disposed on the second surface of the first substrate 111.

The flexible films 122 may be bent toward the bottom of the bottom frame 180 and may be attached to the source circuit boards 140 on a surface of the bottom frame 180. The source circuit boards 140 and the control circuit board 160 may be disposed on the first surface of the bottom frame 180 and may be connected to each other by the first cables 150.

As illustrated for example in FIG. 3, the first sound generator 210 may be disposed substantially closer to a center of the display panel 110 than the second sound generator 220 and the third sound generator 230. The second sound generator 220 may be disposed substantially close to a side of the display panel 110, for example, substantially close to a lower left side of the display panel 110. The third sound generator 230 may be disposed substantially close to the other side of the display panel 110, for example, substantially close to a lower right side of the display panel 110.

The first sound generator 210 may include a magnet 211, a bobbin 212, a voice coil 213, and a plate 215 as illustrated in FIGS. 8 and 9. The bobbin 212 may be attached onto the one surface of the heat dissipation film 130 by an adhesive member 400. The adhesive member 400 may be a double-sided adhesive or a double-sided tape, for example. The voice coil 213 may be wound on an outer circumferential surface of the bobbin 212. Since the bobbin 212 is cylindrical, a central protrusion 211*b* of the magnet 211 may be disposed inside the bobbin 212, and sidewalls 211*c* of the magnet 211 may be disposed outside the bobbin 212. The plate 215 may be disposed on a lower surface of the magnet 211. The plate 215 may be fixed onto one surface of the control circuit board 160 by first fixing members 216 such as screws.

While the magnet 211 and the bobbin 212 are disposed in the hole H of the bottom frame 180, the plate 215 is disposed on the first surface of the bottom frame 180 and may not be disposed in the hole H of the bottom frame 180. The hole H may be smaller in size than the plate 215.

In FIGS. 3 through 6, the magnet 211 and the bobbin 212 may be circular in plan view, the plate 215 may be quadrilateral in plan view, and the hole H may be circular in plan view. However, the planar shape of the plate 215, the planar shape of the bobbin 212, and the planar shape of the hole H are not limited to those illustrated in FIGS. 3 through 6. For example, the bobbin 212 and the hole H may also be elliptical or polygonal in plan view. The plate 215 may be circular, elliptical, or polygonal in plan view.

The bobbin 212 of the first sound generator 210 may be fixed onto the one surface of the heat dissipation film 130, and the magnet 211 may be fixed to the bottom frame 180. Therefore, the bobbin 212 on which the voice coil 213 is wound may reciprocate in the third direction (Z-axis direction) according to an applied magnetic field formed around the voice coil 213, thereby vibrating the display panel 110.

Each of the second sound generator 220 and the third sound generator 230 may be attached onto the one surface of the dissipation film 130 by an adhesive member such as a pressure sensitive adhesive. The second sound generator 220 may be electrically connected to the control circuit board 160 by the first sound circuit board 251, and the third sound generator 230 may be electrically connected to the control circuit board 160 by the second sound circuit board 252. Each of the first sound circuit board 251 and the second sound circuit board 252 may be a flexible printed circuit board or a flexible cable.

A first pad and a second pad may be formed on a side of each of the first sound circuit board 251 and the second sound circuit board 252. The first pad of the first sound circuit board 251 may be connected to a first electrode of the second sound generator 220, and the second pad of the first sound circuit board 251 may be connected to a second electrode of the second sound generator 220. The first pad of the second sound circuit board 252 may be connected to a first electrode of the third sound generator 230, and the second pad of the second sound circuit board 252 may be connected to a second electrode of the third sound generator 230.

A connection portion for connection to a $(2B)^{th}$ connector 152*b* of the control circuit board 160 may be formed on the other side of each of the first sound circuit board 251 and the second sound circuit board 252. The second sound generator 220 may be connected to a $(2B)^{th}$ connector 152*b* of the control circuit board 160 by the connection portion of the first sound circuit board 251. The third sound generator 230 may be connected to another $(2B)^{th}$ connector 152*b* of the control circuit board 160 by the connection portion of the second sound circuit board 252.

The timing control circuit 170 and the sound driving circuit 171 may be disposed on the control circuit board 160. The sound driving circuit 171 may also be disposed on a circuit board other than the control circuit board 160. For example, the sound driving circuit 171 may be disposed on the system circuit board, the power circuit board, or a sound circuit board. The sound circuit board refers to a circuit board on which the sound driving circuit 171 may be disposed without other integrated circuits.

The sound driving circuit 171 may include a digital signal processor (DSP) for digitally processing sound signals, a digital-to-analog converter (DAC) for converting digital signals output from the DSP into driving voltages which are analog signals, and an amplifier (AMP) for amplifying the analog driving voltages output from the DAC and outputting the amplified analog driving voltages.

The sound driving circuit 171 may generate the first sound signal including a $(1A)^{th}$ driving voltage and a $(1B)^{th}$ driving voltage for driving the first sound generator 210 according to stereo signals. The sound driving circuit 171 may generate the second sound signal including a $(2A)^{th}$ driving voltage and a $(2B)^{th}$ driving voltage for driving the second sound generator 220 according to stereo signals. The sound driving circuit 171 may generate the third sound signal including a $(3A)^{th}$ driving voltage and a $(3B)^{th}$ driving voltage for driving the third sound generator 230 according to stereo signals.

The first sound generator 210 may receive the first sound signal including the $(1A)^{th}$ driving voltage and the $(1B)^{th}$ driving voltage from the sound driving circuit 171. The first sound generator 210 may output sound by vibrating the display panel 110 according to the $(1A)^{th}$ driving voltage and the $(1B)^{th}$ driving voltage. When the plate 215 of the first sound generator 210 is disposed on the bottom frame 180, both ends of the voice coil 213 of the first sound generator 210 may be connected to a first sound wiring WL1 and a second sound wiring WL2. The first sound wiring WL1 and the second sound wiring WL2 may be electrically connected to metal lines of the control circuit board 160.

The second sound generator 220 may receive the second sound signal including the $(2A)^{th}$ driving voltage and the $(2B)^{th}$ driving voltage from the sound driving circuit 171. The second sound generator 220 may output sound by vibrating the display panel 110 according to the $(2A)^{th}$ driving voltage and the $(2B)^{th}$ driving voltage. The second sound signal of the sound driving circuit 171 may be transmitted to the second sound generator 220 through the first sound circuit board 251.

The third sound generator 230 may receive the third sound signal including the $(3A)^{th}$ driving voltage and the $(3B)^{th}$ driving voltage from the sound driving circuit 171. The third sound generator 230 may output sound by vibrating the display panel 110 according to the $(3A)^{th}$ driving voltage and the $(3B)^{th}$ driving voltage. The third sound signal of the sound driving circuit 171 may be transmitted to the third sound generator 230 through the second sound circuit board 252.

The second sound generator 220 and the third sound generator 230 may be disposed on the one surface of the heat dissipation film 130. For example, the first sound circuit board 251 connected to the second sound generator 220 may be connected to a $(2B)^{th}$ connector 152*b* of the control circuit board 160 through the first cable hole CH1 penetrating the bottom frame 180. For example, the second sound circuit board 252 connected to the third sound generator 230 may be connected to another $(2B)^{th}$ connector 152*b* of the control circuit board 160 through the second cable hole CH2 penetrating the bottom frame 180. The first cable hole CH1 may be disposed between a side of the control circuit board 160 and the second sound generator 220 when seen in plan view.

The second cable hole CH2 may be disposed between the other side of the control circuit board 160 and the third sound generator 230 when seen in plan view.

The first blocking member 191, the second blocking member 192, and the third blocking member 193 may block the propagation of vibrations of the display panel 110 caused by the first through third sound generators 210 through 230 or the transmission of sound generated by the vibrations of the display panel 110. The first blocking member 191, the second blocking member 192, and the third blocking member 193 may be attached to the one surface of the heat dissipation film 130 and the other surface of the bottom frame 180. For example, when the heat dissipation film 130 is omitted, the first blocking member 191, the second blocking member 192, and the third blocking member 193 may be attached to the one surface of the first substrate 111 and the other surface of the bottom frame 180.

The first blocking member 191 may be disposed at four edges of the heat dissipation film 130 as illustrated in FIG. 3. Referring to FIG. 3, the first blocking member 191 may include two pairs of openings OPN disposed at the left and right short sides of the display panel 110 to face each other. The openings OPN are areas from which the first blocking member 191 has been removed and may be passages through which low-frequency and high-frequency sounds generated by the first sound generator 210, the second sound generator 220 and the third sound generator 230 are emitted. The number and sizes of the openings OPN are not limited to those illustrated in the drawings and may vary according to the sound output design.

The second blocking member 192 may include a first section 192*a* which generally extends in the first direction (X-axis direction) and a second section 192*b* which generally extends in the second direction (Y-axis direction) at a predetermined distance from the plate 215 of the first sound generator 210 to surround the quadrilateral plate 215 of the first sound generator 210 and a third section 192*c* which generally extends in a first diagonal direction DDR1 and a second diagonal direction DDR2 toward upper left and right corners of the display panel 110 from ends of the second section 192*b* extending in the second direction (Y-axis direction). Each contact point where the first section 192*a* and the second section 192*b* meet may be spaced apart from the third blocking member 193 by a predetermined distance.

The third blocking member 193 may extend in the first direction (X-axis direction) and may be disposed below the second sound generator 220 and the third sound generator 230.

The first sound generator 210 may be disposed in a first area A1 surrounded by the second blocking member 192 and the third blocking member 193. The second sound generator 220 may be disposed in a second area A2 surrounded by the first through third blocking members 191 through 193. The third sound generator 230 may be disposed in a third area A3 surrounded by the first through third blocking members 191 through 193.

The first sound generator 210, the second sound generator 220, and the third sound generator 230 may secure their own independent spaces such as the first through third areas A1 through A3 but may be connected to each other instead of being isolated from each other. Therefore, the vibration of the display panel 110 caused by the first sound generator 210, the vibration of the display panel 110 caused by the second sound generator 220, and the vibration of the display panel 110 caused by the third sound generator 230 may be less affected by each other. As a sound output backward from the display panel 110 passes through an air duct formed by the first through third blocking members 191 through 193, the phase of the sound may be reversed, or the sound may be amplified to further enhance bass sound.

The first sound generator 210 may vibrate the first area A1 of the display panel 110 to output a first sound in a low-frequency range. The second sound generator 220 may vibrate the second area A2 of the display panel 110 to output a second sound which is right stereo sound in a high-frequency range. The third sound generator 230 may vibrate the third area A3 of the display panel 110 to output a third sound which is left stereo sound in a high-frequency range.

The first through third sound generators 210 through 230 may vibrate the display panel 110 to output a fourth sound in low-frequency and high-frequency ranges backward from the display panel 110. The fourth sound may pass through the air duct formed by the first through third blocking members 191 through 193 and then may be emitted through the openings OPN formed in the first blocking member 191, thereby enhancing bass sound.

For example, the display device 10 may provide bass-enhanced 2.1-channel stereo sound to a user.

Each of the first blocking member 191, the second blocking member 192, and the third blocking member 193 may include a base film 191*a*, a buffer layer 191*b*, a sacrificial layer 191*c*, a first adhesive layer 191*d*, and a second adhesive layer 191*e* as illustrated in FIG. 5.

The base film 191*a* may be made of plastic. For example, the base film 191*a* may be polyethylene terephthalate (PET).

The buffer layer 191*b* may be disposed on one surface of the base film 191*a*. The buffer layer 191*b* may be made of foam having elasticity. For example, the buffer layer 191*b* may be made of polyurethane, silicone, rubber, or aerogel.

The sacrificial layer 191*c* may be disposed on one surface of the buffer layer 191*b*. The sacrificial layer 191*c* may be separated when each of the first through third blocking members 191, 192, 193 has to be detached after being wrongly attached. The first adhesive layer 191*d* and a portion of the sacrificial layer 191*c* may remain on the one surface of the heat dissipation film 130. The sacrificial layer 191*c* may be made of a material with low elasticity. For example, the sacrificial layer 191*c* may be made of polyurethane. The sacrificial layer 191*c* may be omitted.

The first adhesive layer 191*d* may be disposed on one surface of the sacrificial layer 191*c*. The first adhesive layer 191*d* may be attached onto the one surface of the heat dissipation film 130. The second adhesive layer 191*e* may be disposed on the one surface of the bottom frame 180. The second adhesive layer 191*e* may be attached onto the one surface of the bottom frame 180. The first adhesive layer 191*d* and the second adhesive layer 191*e* may be, but are not limited to, acrylic adhesives or silicone adhesives.

The first sound generator 210 may be an exciter that vibrates the display panel 110 by generating a magnetic force using a voice coil 213 as illustrated in FIGS. 8 and 9. Each of the second sound generator 220 and the third sound generator 230 may be a piezoelectric element or a piezoelectric actuator that vibrates the display panel 110 using a piezoelectric material that contracts or expands according to an applied voltage as illustrated in FIGS. 10 and 11. The first sound output when the display panel 110 is vibrated by the first sound generator 210 may be a low-frequency sound. Therefore, the vibration displacement of the display panel 110 caused by the first sound generator 210 may be greater than the vibration displacement of the display panel 110 caused by the second sound generator 220 or the vibration displacement of the display panel 110 caused by the third sound generator 230. When the vibration displacement of the display panel 110 caused by the first sound generator 210 is large, the vibration of the display panel 110 may be visible to a user when viewing an image.

According to the embodiment illustrated in FIGS. 3 through 6, the first sound circuit board 251 connected to the second sound generator 220 is connected to the control circuit board 160 through the first cable hole CH1 penetrating the bottom frame 180. Therefore, even if the second sound generator 220 is disposed on the one surface of the heat dissipation film 130 and the control circuit board 160 is disposed on the first surface of the bottom frame 180, the control circuit board 160 and the second sound generator 220 may be easily electrically connected to each other.

FIG. 7 is a schematic cross-sectional view of an example of the first substrate 111, the second substrate 112, and the pixel array layer 113 of the display panel 110.

Referring to FIG. 7, the display panel 110 may include the first substrate 111, the second substrate 112, and the pixel array layer 113. The pixel array layer 113 may include the thin-film transistor layer TFTL and the light emitting layer EML.

A buffer layer 302 may be formed on one surface of the first substrate 111 which faces the second substrate 112. The buffer layer 302 may be formed on the first substrate 111 to protect thin-film transistors 335 and light emitting elements from moisture introduced through the first substrate 111 which is vulnerable to moisture penetration. The buffer layer 302 may be composed of inorganic layers stacked alternately. For example, the buffer layer 302 may be a multilayer in which one or more inorganic layers selected from a silicon oxide (SiOx) layer, a silicon nitride (SiNx) layer, and SiON are alternately stacked. The buffer layer 302 can be omitted.

The thin-film transistor layer TFTL may be formed on the buffer layer 302. The thin-film transistor layer TFTL includes the thin-film transistors 335, a gate insulating layer 336, an interlayer insulating film 337, a protective layer 338, and a planarization layer 339.

The thin-film transistors 335 may be formed on the buffer layer 302. Each of the thin-film transistors 335 includes an active layer 331, a gate electrode 332, a source electrode 333, and a drain electrode 334. In FIG. 7, each of the thin-film transistors 335 is formed as a top-gate type in which the gate electrode 332 is located above the active layer 331. However, it should be noted that embodiments are not limited thereto. For example, each of the thin-film transistors 335 may also be formed as a bottom-gate type in which the gate electrode 332 is located under the active layer 331 or a double-gate type in which the gate electrode 332 is located both above and under the active layer 331.

The active layers 331 may be formed on the buffer layer 302. The active layers 331 may be made of a silicon-based semiconductor material or an oxide-based semiconductor material. A light shielding layer may be formed between the buffer layer 302 and the active layers 331 to block external light from entering the active layers 331.

The gate insulating layer 336 may be formed on the active layers 331. The gate insulating layer 336 may be an inorganic layer, for example, a SiOx layer, a SiNx layer, or a multilayer composed of these layers.

The gate electrodes 332 and gate lines may be formed on the gate insulating layer 336. Each of the gate electrodes 332 and the gate lines may be a single layer or a multilayer made of any one or more of molybdenum (Mo), aluminum (Al), chromium (Cr), gold (Au), titanium (Ti), nickel (Ni), neodymium (Ne), copper (Cu), and alloys of the same.

The interlayer insulating film 337 may be formed on the gate electrodes 332 and the gate lines. The interlayer insulating film 337 may be an inorganic layer, for example, a SiOx layer, a SiNx layer, or a multilayer composed of these layers.

The source electrodes 333, the drain electrodes 334, and data lines may be formed on the interlayer insulating film 337. Each of the source electrodes 333 and the drain electrodes 334 may be connected to an active layer 331 through a contact hole penetrating the gate insulating layer 336 and the interlayer insulating film 337. Each of the source electrodes 333, the drain electrodes 334 and the data lines may be a single layer or a multilayer made of any one or more of molybdenum (Mo), aluminum (Al), chromium (Cr), gold (Au), titanium (Ti), nickel (Ni), neodymium (Ne), copper (Cu), and alloys of the same.

The protective layer 338 for insulating the thin-film transistors 335 may be formed on the source electrodes 333, the drain electrodes 334, and the data lines. The protective layer 338 may be an inorganic layer, for example, a SiOx layer, a SiNx layer, or a multilayer composed of these layers.

The planarization layer 339 may be formed on the protective layer 338 to planarize steps due to the thin-film transistors 335. The planarization layer 339 may be made of an organic layer such as acryl resin, epoxy resin, phenolic resin, polyamide resin, or polyimide resin.

The light emitting element layer EML may be formed on the thin-film transistor layer TFTL. The light emitting element layer EML includes the light emitting elements and a pixel defining layer 344.

The light emitting elements and the pixel defining layer 344 may be formed on the planarization layer 339. The light emitting elements may be organic light emitting devices. For example, each of the light emitting elements may include an anode 341, a light emitting layer 342, and a cathode 343.

The anodes 341 may be formed on the planarization layer 339. The anodes 341 may be connected to the drain electrodes 334 of the thin-film transistors 335 through contact holes penetrating the protective layer 338 and the planarization layer 339.

The pixel defining layer 344 may be formed on the planarization layer 339 and may cover edges of the anodes 341 to define pixels. For example, the pixel defining layer 344 serves as a pixel defining layer for defining subpixels PX1 through PX3. Each of the subpixels PX1 through PX3 is an area in which the anode 341, the light emitting layer 342 and the cathode 343 are sequentially stacked so that holes from the anode 341 and electrons from the cathode 343 combine together in the light emitting layer 342 to emit light.

The light emitting layer 342 may be formed on the anodes 341 and the pixel defining layer 344. The light emitting layer 342 may be an organic light emitting layer. The light emitting layer 342 may emit light having a short wavelength, such as blue light or ultraviolet light. The blue light may have a peak wavelength range of about 450 nm to about 490 nm, and the ultraviolet light may have a peak wavelength range of less than about 450 nm. The light emitting layer 342 may be a common layer common to all of the subpixels PX1 through PX3. The display panel 110 may include the light wavelength conversion layer QDL for converting short-wavelength light such as blue light or ultraviolet light emitted from the light emitting layer 342 into red light, green light and blue light and the color filter layer CFL for transmitting each of the red light, green light and the blue light.

The light emitting layer 342 may include a hole transporting layer, a light emitting layer, and an electron transporting layer. The light emitting layer 342 may be formed in a tandem structure of two or more stacks. A charge generating layer may be formed between the stacks.

The cathode 343 may be formed on the light emitting layer 342. The cathode 343 may be formed to cover the light emitting layer 342. The cathode 343 may be a common layer common to all pixels.

The light emitting element layer EML may be formed as a top emission type which emits light toward the second substrate 112, that is, in an upward direction. The anodes 341 may be made of a metal material having high reflectivity, such as a stacked structure (Ti/Al/Ti) of Al and Ti, a stacked structure (ITO/Al/ITO) of Al and indium tin oxide (ITO), an APC alloy, or a stacked structure (ITO/APC/ITO) of an APC alloy and ITO. The APC alloy is an alloy of Ag, palladium (Pd), and Cu. The cathode 343 may be made of a transparent conductive material (TCO) capable of transmitting light, such as ITO or indium zinc oxide (IZO), or a semi-transmissive conductive material such as magnesium (Mg), Ag or an alloy of Mg and Ag. When the cathode 343 is made of a semi-transmissive conductive material, the light output efficiency may be increased by a microcavity.

An encapsulation film 345 may be formed on the light emitting element layer EML. The encapsulation film 345 serves to prevent oxygen or moisture from permeating into the light emitting layer 342 and the cathode 343. To this end, the encapsulation film 345 may include at least one inorganic layer. The inorganic layer may be made of silicon nitride, aluminum nitride, zirconium nitride, titanium nitride, hafnium nitride, tantalum nitride, silicon oxide, aluminum oxide, or titanium oxide. The encapsulation film 345 may include at least one organic layer. The organic layer may be formed to a sufficient thickness to prevent particles from penetrating the encapsulation film 345 and entering the light emitting layer 342 and the cathode 343. The organic layer may include any one of epoxy, acrylate, and urethane acrylate.

The color filter layer CFL may be disposed on one surface of the second substrate 112 which faces the first substrate 111. The color filter layer CFL may include a black matrix 360 and color filters 370.

The black matrix 360 may be formed on the one surface of the second substrate 112. The black matrix 360 may not overlap the subpixels PX1 through PX3 and may overlap the pixel defining layer 344. The black matrix 360 may include black dye capable of blocking light or an opaque metal material.

The color filters 370 may overlap the subpixels PX1 through PX3. A first color filter 371 may overlap a first subpixel PX1, a second color filter 372 may overlap a second subpixel PX2, and a third color filter 373 may overlap a third subpixel PX3. The first color filter 371 may be a first color light transmitting filter that transmits light of a first color, the second color filter 372 may be a second color light transmitting filter that transmits light of a second color, and the third color filter 373 may be a third color light transmitting filter that transmits light of a third color. For example, the first color may be red, the second color may be green, and the third color may be blue. For example, the peak wavelength range of red light transmitted through the first color filter 371 may be about 620 nm to about 750 nm, the peak wavelength range of green light transmitted through the second color filter 372 may be about 500 nm to about 570 nm, and the peak wavelength range of blue light transmitted through the third color filter 373 may be about 450 nm to about 490 nm.

Edges of two adjacent color filters may overlap the black matrix 360. Therefore, the black matrix 360 may prevent color mixing that occurs when light emitted from the light emitting layer 342 of any one subpixel travels to a color filter of an adjacent subpixel.

An overcoat layer may be formed on the color filters 370 to planarize steps due to the color filters 370 and the black matrix 360. The overcoat layer may be omitted.

The wavelength conversion layer QDL may be disposed on the color filter layer CFL. The wavelength conversion layer QDL may include a first capping layer 351, a first wavelength conversion layer 352, a second wavelength conversion layer 353, a third wavelength conversion layer 354, a second capping layer 355, an interlayer organic film 356, and a third capping layer 357.

The first capping layer 351 may be disposed on the color filter layer CFL. The first capping layer 351 may prevent moisture or oxygen from permeating into the first wavelength conversion layer 352, the second wavelength conversion layer 353 and the third wavelength conversion layer 354 from the outside through the color filter layer CFL. The first capping layer 351 may be made of an inorganic layer such as silicon nitride, aluminum nitride, zirconium nitride, titanium nitride, hafnium nitride, tantalum nitride, silicon oxide, aluminum oxide, or titanium oxide.

The first wavelength conversion layer 352, the second wavelength conversion layer 353 and the third wavelength conversion layer 354 may be disposed on the first capping layer 351.

The first wavelength conversion layer 352 may overlap the first subpixel PX1. The first wavelength conversion layer 352 may convert short-wavelength light such as blue light or ultraviolet light emitted from the light emitting layer 342 of the first subpixel PX into light of the first color. To this end, the first wavelength conversion layer 352 may include a first base resin, a first wavelength shifter, and a first scatterer.

The first base resin may be a material having high light transmittance and superior dispersion characteristics for the first wavelength shifter and the first scatterer. For example, the first base resin may include an organic material such as epoxy resin, acrylic resin, cardo resin, or imide resin.

The first wavelength shifter may convert or shift the wavelength range of incident light. The first wavelength shifter may be quantum dots, quantum rods, or phosphors. For example, when the first wavelength shifter is quantum dots, it may have a specific band gap according to its composition and size as a semiconductor nanocrystalline material. Thus, the first wavelength shifter may absorb incident light and then emit light having a unique wavelength. The first wavelength shifter may have a core-shell structure including a core containing a nanocrystal and a shell surrounding the core. Examples of the nanocrystal that forms the core include group IV nanocrystals, group II-VI compound nanocrystals, group III-V compound nanocrystals, group IV-VI nanocrystals, and combinations of the same. The shell may serve as a protective layer for maintaining semiconductor characteristics by preventing chemical denaturation of the core and/or as a charging layer for giving electrophoretic characteristics to the quantum dot. The shell may be a single layer or a multilayer. The shell may be, for example, a metal or non-metal oxide, a semiconductor compound, or a combination of the same.

The first scatterer may have a refractive index different from that of the first base resin and may form an optical interface with the first base resin. For example, the first scatterer may be light scattering particles. For example, the first scatterer may be metal oxide particles such as titanium oxide ($TiO_2$), silicon oxide ($SiO_2$), zirconium oxide ($ZrO_2$), aluminum oxide ($Al_2O_3$), indium oxide ($In_2O_3$), zinc oxide (ZnO), or tin oxide ($SnO_2$). The first scatterer may be organic particles such as acrylic resin or urethane resin.

The first scatterer may scatter incident light in random directions without substantially changing the wavelength of the light transmitted through the first wavelength conversion layer 352. Accordingly, the length of the path of the light transmitted through the first wavelength conversion layer 352 may be increased, thereby increasing the color conversion efficiency of the first wavelength shifter.

The first wavelength conversion layer 352 may overlap the first color filter 371. Therefore, a portion of short-wavelength light such as blue light or ultraviolet light provided from the first subpixel PX1 can pass through the first wavelength conversion layer 352 as it is without being converted into light of the first color by the first wavelength shifter. However, the short-wavelength light such as blue light or ultraviolet light incident on the first color filter 371 without being converted by the first wavelength conversion layer 352 cannot pass through the first color filter 371. On the other hand, light of the first color into which the short-wavelength light has been converted by the first wavelength conversion layer 352 can pass through the first color filter 371 and proceed toward the second substrate 112.

The second wavelength conversion layer 353 may overlap the second subpixel PX2. The second wavelength conversion layer 353 may convert short-wavelength light such as blue light or ultraviolet light emitted from the light emitting layer 342 of the second subpixel PX2 into light of the second color. To this end, the second wavelength conversion layer 353 may include a second base resin, a second wavelength shifter, and a second scatterer. The second base resin, the second wavelength shifter and the second scatterer of the second wavelength conversion layer 353 may be substantially the same as or similar to those of the first wavelength conversion layer 352, and thus a detailed description thereof is omitted. When the first wavelength shifter and the second wavelength shifter are quantum dots, a diameter of the second wavelength shifter may be smaller than that of the first wavelength shifter.

The second wavelength conversion layer 353 may overlap the second color filter 372. Therefore, a portion of short-wavelength light such as blue light or ultraviolet light provided from the second subpixel PX2 can pass through the second wavelength conversion layer 353 as it is without being converted into light of the second color by the second wavelength shifter. However, the short-wavelength light such as blue light or ultraviolet light incident on the second color filter 372 without being converted by the second wavelength conversion layer 353 cannot pass through the second color filter 372. On the other hand, light of the second color into which the short-wavelength light has been converted by the second wavelength conversion layer 353 can pass through the second color filter 372 and proceed toward the second substrate 112.

The third wavelength conversion layer 354 may overlap the third subpixel PX3. The third wavelength conversion layer 354 may convert short-wavelength light such as blue light or ultraviolet light emitted from the light emitting layer 342 of the third subpixel PX3 into light of the third color. To this end, the third wavelength conversion layer 354 may include a third base resin and a third scatterer. The third base resin and the third scatterer of the third wavelength conversion layer 354 may be substantially the same as or similar to those of the first wavelength conversion layer 352, and thus a detailed description thereof is omitted.

The third wavelength conversion layer 354 may overlap the third color filter 373. Short-wavelength light such as blue light or ultraviolet light provided from the third subpixel PX3 can pass through the third wavelength conversion layer 354 as it is, and the light that passes through the third wavelength conversion layer 353 can pass through the third color filter 373 and proceed toward the second substrate 112.

The second capping layer 355 may be disposed on the first wavelength conversion layer 352, the second wavelength conversion layer 353, the third wavelength conversion layer 354, and the first capping layer 351 exposed without being covered by the wavelength conversion layers 352 through 354. The second capping layer 355 may prevent moisture or oxygen from permeating into the first wavelength conversion layer 352, the second wavelength conversion layer 353 and the third wavelength conversion layer 354 from the outside. The second capping layer 355 may be made of an inorganic layer such as silicon nitride, aluminum nitride, zirconium nitride, titanium nitride, hafnium nitride, tantalum nitride, silicon oxide, aluminum oxide, or titanium oxide.

The interlayer organic film 356 may be disposed on the second capping layer 355. The interlayer organic film 356 may be a planarization layer for planarizing steps due to the wavelength conversion layers 352 through 354. The interlayer organic film 356 may be made of an organic layer such as acryl resin, epoxy resin, phenolic resin, polyamide resin, or polyimide resin.

The third capping layer 357 may be disposed on the interlayer organic film 356. The third capping layer 357 may be made of an inorganic layer such as silicon nitride, aluminum nitride, zirconium nitride, titanium nitride, hafnium nitride, tantalum nitride, silicon oxide, aluminum oxide, or titanium oxide.

The filler FL may be disposed between the encapsulation film 345 disposed on the first substrate 111 and the third capping layer 357 disposed on the second substrate 112. The filler FL may be made of a material having a buffer function. For example, the filler FL may be made of an organic layer such as acryl resin, epoxy resin, phenolic resin, polyamide resin, or polyimide resin.

A sealing material for bonding the first substrate 111 and the second substrate 112 may be disposed in the non-display area of the display panel 110. When seen in plan view, the filler FL may be surrounded by the sealing material. The sealing material may be glass frit or a sealant, for example.

According to the embodiment illustrated in FIG. 7, the first through third subpixels PX1 through PX3 may emit short-wavelength light such as blue light or ultraviolet light. Light of the first subpixel PX1 is converted into light of the first color by the first wavelength conversion layer 352 and then output through the first color filter 371. Light of the second subpixel PX2 is converted into light of the second color by the second wavelength conversion layer 353 and then output through the second color filter 372. Light of the third subpixel PX3 is output through the third wavelength conversion layer 354 and the third color filter 373. Therefore, white light may be output.

According to the embodiment illustrated in FIG. 7, each of the subpixels PX1 through PX3 may be formed as a top emission type which emits light toward the second substrate 112, that is, in the upward direction. Therefore, the heat dissipation film 130 including an opaque material such as graphite or aluminum may be disposed on the one surface of the first substrate 111.

FIGS. 8 and 9 illustrate the vibration of the display panel 110 caused by the first sound generator 210.

Referring to FIGS. 8 and 9, the first sound generator 210 may be an exciter that vibrates the display panel 110 by generating a magnetic force using a voice coil 213. A hole may be formed in an area of the bottom frame 180 in which the first sound generator 210 may be disposed.

The first sound generator 210 may include the magnet 211, the bobbin 212, the voice coil 213, a damper 214, the plate 215, the first fixing members 216, and second fixing members 217.

The magnet 211 may be a permanent magnet, and a sintered magnet such as barium ferrite may be used. The material of the magnet 211 may be, but is not limited to, ferric trioxide ($Fe_2O_3$), barium carbonate ($BaCO_3$), a neodymium magnet, strontium ferrite with an improved magnetic component, or an aluminum (Al), nickel (Ni) or cobalt (Co) alloy cast magnet. The neodymium magnet may be, for example, neodymium-iron-boron (Nd—Fe—B).

The magnet 211 may include a flat portion 211*a*, a central protrusion 211*b* protruding from a center of the flat portion 211*a*, and sidewalls 211*c* protruding from edges of the flat portion 211*a*. The central protrusion 211*b* and the sidewalls 211*c* may be spaced apart from each other by a predetermined distance. Therefore, a predetermined space may be formed between the central protrusion 211*b* and each of the sidewalls 211*c*. For example, the magnet 211 may be shaped like a circular cylinder, for example, a circular cylinder having a circular space formed in any one base of the circular cylinder.

The central protrusion 211*b* of the magnet 211 may have the magnetism of a north (N) pole, and the flat portion 211*a* and the sidewalls 211*c* may have the magnetism of a south (S) pole. Therefore, an external magnetic field may be formed between the central protrusion 211*b* and the flat portion 211*b* of the magnet 211 and between the central protrusion 211*b* and the sidewalls 211*c*.

The bobbin 212 may be cylindrical. Although the bobbin is described as being cylindrical, the bobbin may be substantially cylindrical or formed in other suitable geometries other than cylindrical. The central protrusion 211*b* of the magnet 211 may be disposed inside the bobbin 212. For example, the bobbin 212 may surround the central protrusion 211*b* of the magnet 211. The sidewalls 211*c* of the magnet 211 may be disposed outside the bobbin 212. For example, the sidewalls 211*c* of the magnet 211 may surround the bobbin 212. A space may be formed between the bobbin 212 and the central protrusion 211*b* of the magnet 211 and between the bobbin 212 and the sidewalls 211*c* of the magnet 211.

The bobbin 212 may be made of a material obtained by processing pulp or paper, aluminum or magnesium or an alloy of the same, a synthetic resin such as polypropylene, or a polyamide-based fiber. An end of the bobbin 212 may be attached to the heat dissipation film 130 using an adhesive member 400. The adhesive member 400 may be a double-sided tape.

The voice coil 213 may be wound on the outer circumferential surface of the bobbin 212. An end of the voice coil 213 may be electrically connected to the first sound wiring WL1, and the other end of the voice coil 213 may be electrically connected to the second sound wiring WL2. Therefore, the voice coil 213 may receive the $(1A)^{th}$ driving voltage and the $(1B)^{th}$ driving voltage from the sound driving circuit 171.

The damper 214 may be disposed between the bobbin 212 and the plate 215. A side of the damper 214 may be fixed to the bobbin 212, and the other side of the damper 214 may be fixed to the plate 215 by the second fixing members 217 such as screws. Each of the second fixing members 217 may be inserted and fixed to a damper hole of the damper 214 and a second fixing hole of the plate 215. The damper holes of the damper 214 and the second fixing holes of the plate 215 may be screw holes to which screws can be fixed. The damper holes of the damper 214 may be holes completely penetrating the damper 214, and the second fixing holes of the plate 215 may be holes completely or partially penetrating the plate 215.

The damper 214 may have elasticity and may be made of a material having conductivity. The damper 214 may control the up and down vibration of the bobbin 212 by contacting or relaxing according to the up and down motion of the bobbin 212. For example, since the damper 214 is connected to the bobbin 212 and the plate 215, the up and down motion of the bobbin 212 may be limited by a restoring force of the damper 214. For example, when the bobbin 212 vibrates above a predetermined height or vibrates below a predetermined height, it may be returned to its original position by the restoring force of the damper 214.

The plate 215 may be disposed on the lower surface of the magnet 211. The plate 215 may be formed integrally with the magnet 211 or may be formed separately from the magnet 211. When the plate 215 is formed separately from the magnet 211, the magnet 211 may be attached to the plate 215 by an adhesive member such as a double-sided tape. The plate 215 may be fixed to the bottom frame 180 by the first fixing members 216 such as screws.

A direction in which each of the first fixing members 216 is fixed may be opposite to a direction in which each of the second fixing members 217 is fixed. For example, as illustrated in FIGS. 8 and 9, while each of the first fixing members 216 is fixed in the second direction (Y-axis direction), each of the second fixing members 217 may be fixed in the direction opposite to the first fixing members 216 in the second direction (Y-axis direction).

The plate 215 may be bent between an area 215*a* where the magnet 211 is disposed and an area 215*b* where the first fixing members 216 and the second fixing members 217 are disposed. The area 215*a* where the magnet 211 is disposed may be sunken compared with the area 215*b* where the first fixing members 216 and the second fixing members 217 are disposed. Therefore, a distance between the area 215*a* where the magnet 211 is disposed and the first substrate 111 or the heat dissipation film 130 may be greater than a distance between the area 215*b* where the first fixing members 216 and the second fixing members 217 are disposed and the first substrate 111 or the heat dissipation film 130. Accordingly, since a distance between the bottom frame 180 and the first substrate 111 can be minimized even without reducing a height of the first sound generator 210, a thickness of the display device 10 can be reduced. The height of the first sound generator 210 refers to a distance from the end of the bobbin 212 which contacts the heat dissipation film 130 to the plate 215 which contacts the magnet 211.

An end of the voice coil 213 may be electrically connected to the sound driving circuit 171 by the first sound wiring WL1 to receive the $(1A)^{th}$ driving voltage from the sound driving circuit 171. The other end of the voice coil 213 may be electrically connected to the sound driving circuit 171 by the second sound wiring WL2 to receive the $(1B)^{th}$ driving voltage from the sound driving circuit 171. An electric current may flow through the voice coil 213 according to a first driving voltage and a second driving voltage, and an applied magnetic field may be formed around the voice coil 213 according to the electric current flowing through the voice coil 213. The direction of the electric current flowing through the voice coil 213 when the $(1A)^{th}$ driving voltage is a positive voltage and the $(1B)^{th}$ driving voltage is a negative voltage is opposite to the direction of the electric current flowing through the voice coil 213 when the $(1A)^{th}$ driving voltage is a negative voltage and the $(1B)^{th}$ driving voltage is a positive voltage. Therefore, the N pole and the S pole of the applied magnetic field formed around the voice coil 213 may be changed according to the alternating current (AC) driving of the $(1A)^{th}$ driving voltage and the $(1B)^{th}$ driving voltage. Accordingly, an attractive force and a repulsive force alternately act on the magnet 211 and the voice coil 213, causing the bobbin 212 on which the voice coil 213 is wound to reciprocate in the third direction (Z-axis direction) as illustrated in FIGS. 8 and 9. Therefore, the display panel 110 may vibrate in the third direction (Z-axis direction) as illustrated in FIGS. 8 and 9, thereby outputting sound.

Although the magnet 211 and the plate 215 may be fixed to the bottom frame 180 in the disclosure, embodiments are not limited thereto. For example, the magnet 211 and the plate 215 may also be fixed to the control circuit board 160, the system circuit board, the power circuit board, a sound circuit board, or a dummy circuit board, instead of the bottom frame 180. A hole corresponding to the hole H of the bottom frame 180 may be formed in the control circuit board 160, the system circuit board, the power circuit board, the sound circuit board, or the dummy circuit board. The dummy circuit board refers to a circuit board on which elements other than the magnet 211 and the plate 215 of the first sound generator 210 and an amplifier for amplifying the first sound signal to be provided to the first sound generator 210 are not disposed. The dummy circuit board may be a flexible printed circuit board or a printed circuit board.

According to the embodiment illustrated in FIGS. 8 and 9, the bobbin 212 is fixed to the first substrate 111 or the heat dissipation film 130, and the plate 215 to which the magnet 211 is coupled is fixed to the bottom frame 180. Since the bottom frame 180 which supports the magnet 211 may be rigid as compared with the display panel 110, the bobbin 212 on which the voice coil 213 is wound may reciprocate from the fixed magnet 211 according to an applied magnetic field. The reciprocating motion of the bobbin 212 may cause the display panel 110 to vibrate in the third direction (Z-axis direction) as illustrated in FIGS. 8 and 9 and thus output sound.

According to the embodiment illustrated in FIGS. 8 and 9, the plate 215 is bent between the area 215*a* where the magnet 211 is disposed and the area 215*b* where the first fixing members 216 and the second fixing members 217 are disposed. Accordingly, since the distance between the bottom frame 180 and the first substrate 111 can be minimized even without reducing the height of the first sound generator 210, the thickness of the display device 10 can be reduced.

FIG. 10 illustrates the vibration of the display panel 110 caused by the second and third sound generators 220 and 230. FIG. 10 illustrates the example of the second sound generator 220. FIG. 11 illustrates a method of vibrating a vibration layer 221 disposed between a first branch electrode 2222 and a second branch electrode 2232 of each of the second and third sound generators 220 and 230.

Referring to FIGS. 10 and 11, each of the second and third sound generators 220 and 230 may be a piezoelectric element or a piezoelectric actuator that vibrates the display panel 110 using a piezoelectric material that contracts or expands according to an applied voltage. Each of the second and third sound generators 220 and 230 may include the vibration layer 221, a first electrode 222, and a second electrode 223.

The first electrode 222 may include a first stem electrode 2221 and first branch electrodes 2222. The first stem electrode 2221 may be disposed on at least one side surface of the vibration layer 221 as illustrated in FIG. 11. As an example, the first stem electrode 2221 may partially penetrate the vibration layer 221. The first stem electrode 2221 may also be disposed on an upper surface of the vibration layer 221. The first branch electrodes 2222 may branch from the first stem electrode 2221. The first branch electrodes 2222 may be arranged parallel to each other.

The second electrode 223 may include a second stem electrode 2231 and second branch electrodes 2232. The second electrode 223 may be spaced apart from the first electrode 222. Therefore, the second electrode 223 may be electrically isolated from the first electrode 222. The second stem electrode 2231 may be disposed on at least one side surface of the vibration layer 221. For example, first stem electrode 2221 may be disposed on a first side surface of the vibration layer 221, and the second stem electrode 2231 may be disposed on a second side surface of the vibration layer 221. As an example, the second stem electrode 2231 may partially penetrate the vibration layer 221. The second stem electrode 2231 may be disposed on the upper surface of the vibration layer 221. The second branch electrodes 2232 may branch from the second stem electrode 2231. The second branch electrodes 2232 may be arranged parallel to each other.

The first branch electrodes 2222 and the second branch electrodes 2232 may be arranged parallel to each other in a horizontal direction (X-axis direction or Y-axis direction). As an example, the first branch electrodes 2222 and the second branch electrodes 2232 may be alternately arranged in a vertical direction (Z-axis direction). For example, the first branch electrodes 2222 and the second branch electrodes 2232 may be repeatedly arranged in the vertical direction (Z-axis direction) in the order of the first branch electrode 2222, the second branch electrode 2232, the first branch electrode 2222, and the second branch electrode 2232.

The first electrode 222 and the second electrode 223 may be connected to pads of the first sound circuit board 251 or the second sound circuit board 252. The pads of the first sound circuit board 251 or the second sound circuit board 252 may be connected to the first electrode 222 and the second electrode 223 disposed on one surface of the second sound generator 220.

The vibration layer 221 may be a piezoelectric element that is deformed according to the first driving voltage applied to the first electrode 222 and the second driving voltage applied to the second electrode 223. The vibration layer 221 may be any one of a piezoelectric material, such as a polyvinylidene fluoride (PVDF) film or plumbum ziconate titanate (PZT), and an electroactive polymer.

Since the production temperature of the vibration layer 221 is high, the first electrode 222 and the second electrode 223 may be made of silver (Ag) having a high melting point or an alloy of Ag and palladium (Pd). When the first electrode 222 and the second electrode 223 are made of an alloy of Ag and Pd, the Ag content may be higher than the Pd content in order to raise melting points of the first electrode 222 and the second electrode 223.

The vibration layer 221 may be disposed between each pair of the first and second branch electrodes 2222 and 2232. The vibration layer 221 may contract or expand according to a difference between the first driving voltage applied to each first branch electrode 2222 and the second driving voltage applied to a corresponding second branch electrode 2232.

For example, as illustrated in FIG. 10, when the polarity direction of the vibration layer 221 disposed between a first branch electrode 2222 and a second branch electrode 2232 disposed under or opposite the first branch electrode 2222 is an upward direction (↑), the vibration layer 221 may have a positive polarity in an upper area adjacent to the first branch electrode 2222 and a negative polarity in a lower area adjacent to the second branch electrode 2232. When the polarity direction of the vibration layer 221 disposed between a second branch electrode 2232 and a first branch electrode 2222 disposed under or opposite the second branch electrode 2232 is a downward direction (↓), the vibration layer 221 may have a negative polarity in an upper area adjacent to the second branch electrode 2232 and a positive polarity in a lower area adjacent to the first branch electrode 2222. The polarity direction of the vibration layer 221 may be determined by a poling process of applying an electric field to the vibration layer 221 using a first branch electrode 2222 and a second branch electrode 2232.

When the polarity direction of the vibration layer 221 disposed between a first branch electrode 2222 and a second branch electrode 2232 disposed under or opposite the first branch electrode 2222 is the upward direction (↑) as illustrated in FIG. 11, if the $(2A)^{th}$ driving voltage of the positive polarity is applied to the first branch electrode 2222 and the $(2B)^{th}$ driving voltage of the negative polarity is applied to the second branch electrode 2232, the vibration layer 221 may contract according to a first force F1. The first force F1 may be a compressive force. Also, if the $(2A)^{th}$ driving voltage of the negative polarity is applied to the first branch electrode 2222 and the $(2B)^{th}$ driving voltage of the positive polarity is applied to the second branch electrode 2232, the vibration layer 221 may expand according to a second force F2. The second force F2 may be a tensile force.

Similarly, when the polarity direction of the vibration layer 221 disposed between a second branch electrode 2232 and a first branch electrode 2222 disposed under or opposite the second branch electrode 2232 is the downward direction (↓), if the $(2A)^{th}$ driving voltage of the positive polarity is applied to the second branch electrode 2232 and the $(2B)^{th}$ driving voltage of the negative polarity is applied to the first branch electrode 2222, the vibration layer 221 may expand according to a tensile force. Also, if the $(2A)^{th}$ driving voltage of the negative polarity is applied to the second branch electrode 2232 and the $(2B)^{th}$ driving voltage of the positive polarity is applied to the first branch electrode 2222, the vibration layer 221 may contract according to a compressive force.

When the $(2A)^{th}$ driving voltage applied to the first electrode 222 and the $(2B)^{th}$ driving voltage applied to the second electrode 223 repeatedly alternate between the positive polarity and the negative polarity, the vibration layer 221 may repeatedly contract and expand, thus causing the second sound generator 220 to vibrate. Since the second sound generator 220 is disposed on the one surface of the heat dissipation film 130, when the vibration layer 221 of the second sound generator 220 contracts and expands, the display panel 110 may vibrate in the third direction (Z-axis direction) due to stress, which is the thickness direction. As the display panel 110 is vibrated by the second sound generator 220 in this way, the display device 10 may output sound.

Hereinafter, other embodiments will be described. In the following embodiments, a description of elements identical to those of the above-described embodiment will be omitted or given briefly. The following embodiments will be described, focusing on differences from the above-described embodiment.

Figure 12:
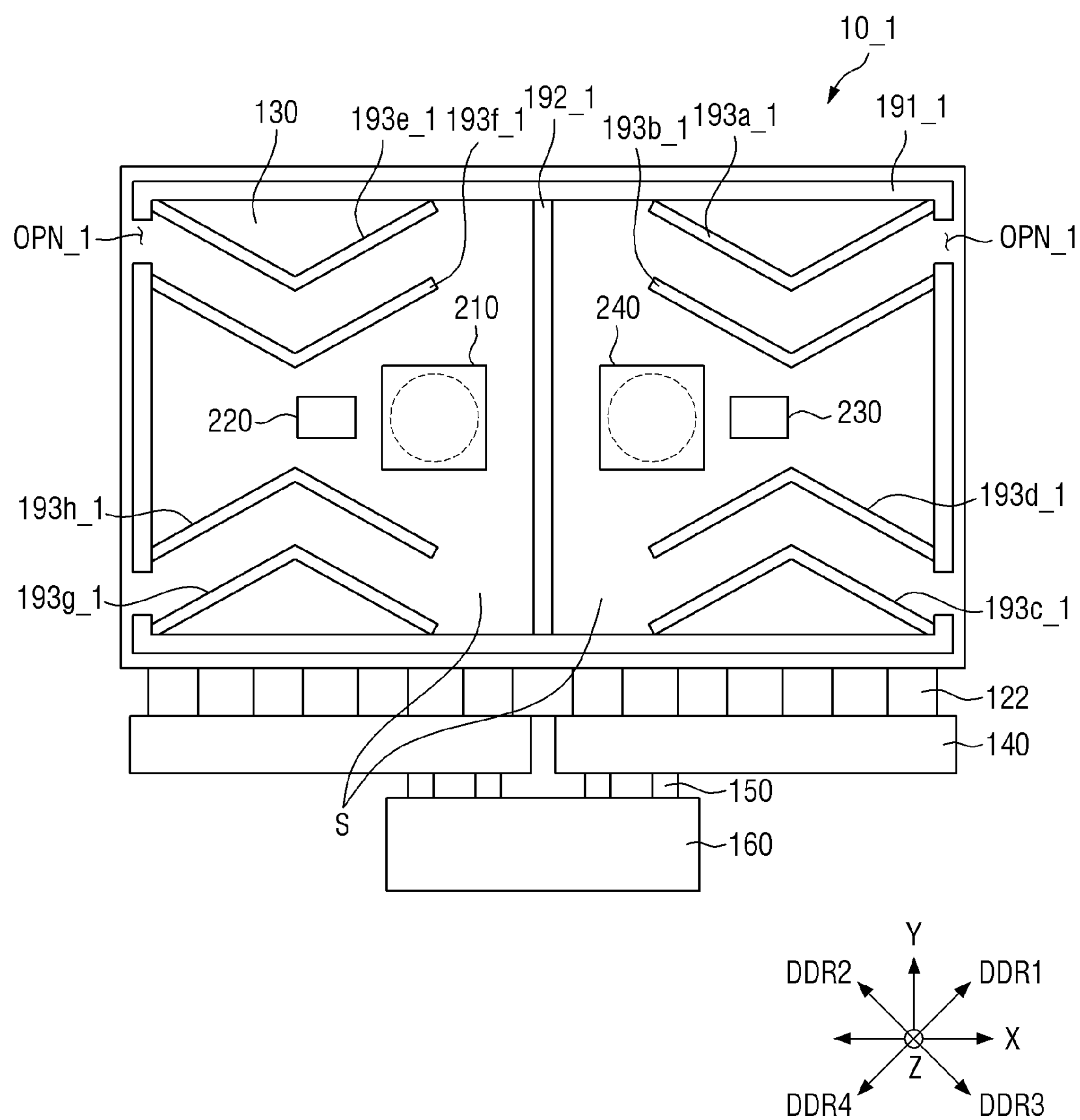
FIG. 12 is a bottom view illustrating an example of a display panel when flexible films are unfolded in FIG. 1 according to an embodiment.

FIG. 12 is a bottom view illustrating an example of a display panel 110 when flexible films are unfolded in FIG. 1 according to an embodiment.

Referring to FIGS. 1 and 12, the embodiment is different from the embodiment of FIG. 3 in the arrangement of first through third blocking members 191_1 through 193_1 and in that a fourth sound generator 240 is provided.

For example, a first sound generator 210 may be disposed on a side of a display panel 110, for example, on a left side of the display panel 110. The fourth sound generator 240 may be disposed on a side of the display panel 110, for example, on a right side of the display panel 110. Each of the first sound generator 210 and the fourth sound generator 240 may be an exciter that vibrates the display panel 110 by generating a magnetic force using a voice coil 213 as illustrated in FIGS. 8 and 9. Since the first sound generator 210 and the fourth sound generator 240 may be substantially the same, a description of the fourth sound generator 240 is omitted.

A second sound generator 220 may be disposed adjacent to the first sound generator 210. A third sound generator 230 may be disposed adjacent to the fourth sound generator 240.

The first blocking member 191_1, the second blocking member 192_1, and the third blocking member 193_1 may block the propagation of vibrations of the display panel 110 caused by the sound generators 210 through 240 or the transmission of sound generated by the vibrations of the display panel 110. The first blocking member 191_1, the second blocking member 192_1 and the third blocking member 193_1 may be attached to one surface of a heat dissipation film 130 and a second surface of a bottom frame 180. As an example, when the heat dissipation film 130 is omitted, the first blocking member 191_1, the second blocking member 1921, and the third blocking member 193_1 may be attached to one surface of a first substrate 111 and the second surface of the bottom frame 180.

The first blocking member 191_1 may be disposed at four edges of the heat dissipation film 130 as in FIG. 12. As illustrated in FIG. 12, the first blocking member 191_1 may include two pairs of openings OPN_1 disposed at left and right short sides of the display panel 110 to face each other. The openings OPN_1 illustrated in FIG. 12 may be disposed closer to upper and lower surfaces of the display panel 110 than the openings OPN illustrated in FIG. 3.

The second blocking member 192_1 may extend in the second direction (Y-axis direction) along a central axis of the display panel 110. Both ends of the second blocking member 192_1 may contact the first blocking member 191_1. Therefore, one empty cuboid space "S" may be formed in each of left and right areas of the display panel 110.

The third blocking member 193_1 may include sub-blocking members **193*a*_1, 193*b*_1, 193*c*_1, 193*d*_1, 193*e*_1, 193*f*_1, 193*g*_1 and 193*h*_1 which may generally extend in the first direction (X-axis direction) and may be bent in the first diagonal direction DDR1 and the second diagonal direction DDR2 and bent in a third diagonal direction DDR3 and a fourth diagonal direction DDR4**.

First and second sub-blocking members **193*a*_1 and 193*b*_1 bent in the first diagonal direction DDR1 and the second diagonal direction DDR2 may be spaced apart from each other in the second direction (Y-axis direction) by a predetermined distance and may be disposed parallel to each other. Ends of the first and second sub-blocking members 193*a*_1 and 193*b*_1 may be adjacent to an opening OPN_1 formed at an upper right side of the display panel 110**, and the other ends of the first and second sub-blocking members

**193*a*_1 and 193*b*_1 may be spaced apart from the second blocking member 192_1** by a predetermined distance.

Third and fourth sub-blocking members **193*c*_1 and 193*d*_1 bent in the third diagonal direction DDR3 and the fourth diagonal direction DDR4 may be spaced apart from each other in the second direction (Y-axis direction) by a predetermined distance and may be disposed parallel to each other. Ends of the third and fourth sub-blocking members 193*c*_1 and 193*d*_1 may be adjacent to an opening OPN_1 formed at a lower right side of the display panel 110, and the other ends of the third and fourth sub-blocking members 193*c*_1 and 193*d*_1 may be spaced apart from the second blocking member 192_1** by a predetermined distance.

Fifth through eighth sub-blocking members **193*e*_1 through 193*h*_1 may be the same as or similar to the first through fourth sub-blocking members 193*a*_1 through 193*d*_1 except that they may be symmetrical to the first through fourth sub-blocking members 193*a*_1 through 193*d*_1**, and thus a detailed description thereof is omitted.

Vibration energy applied to the display panel 110 when the display panel 110 is vibrated using exciters may be greater than vibration energy applied to the display panel 110 when the display panel 110 is vibrated using one exciter. Therefore, when a first sound in a low-frequency range is output by vibrating the display panel 110 using the first sound generator 210 and the fourth sound generator 240, a sound pressure level of the first sound may be increased.

The first and second sound generators 210 and 220 may vibrate the left side of the display panel 110 to output a fifth sound in low-frequency and high-frequency ranges backward from the left side of the display panel 110, and the third and fourth sound generators 230 and 240 may vibrate the right side of the display panel 110 to output a sixth sound in low-frequency and high-frequency ranges backward from the right side of the display panel 110. The fifth sound and the sixth sound may pass through an air duct formed by the first through third blocking members 191_1 through 193_1 and then may be emitted through the openings OPN_1 formed in the first blocking member 191_1, thereby enhancing bass sound.

For example, a display device 10_1 may provide bass-enhanced 2.2-channel stereo sound to a user.

Figure 13:
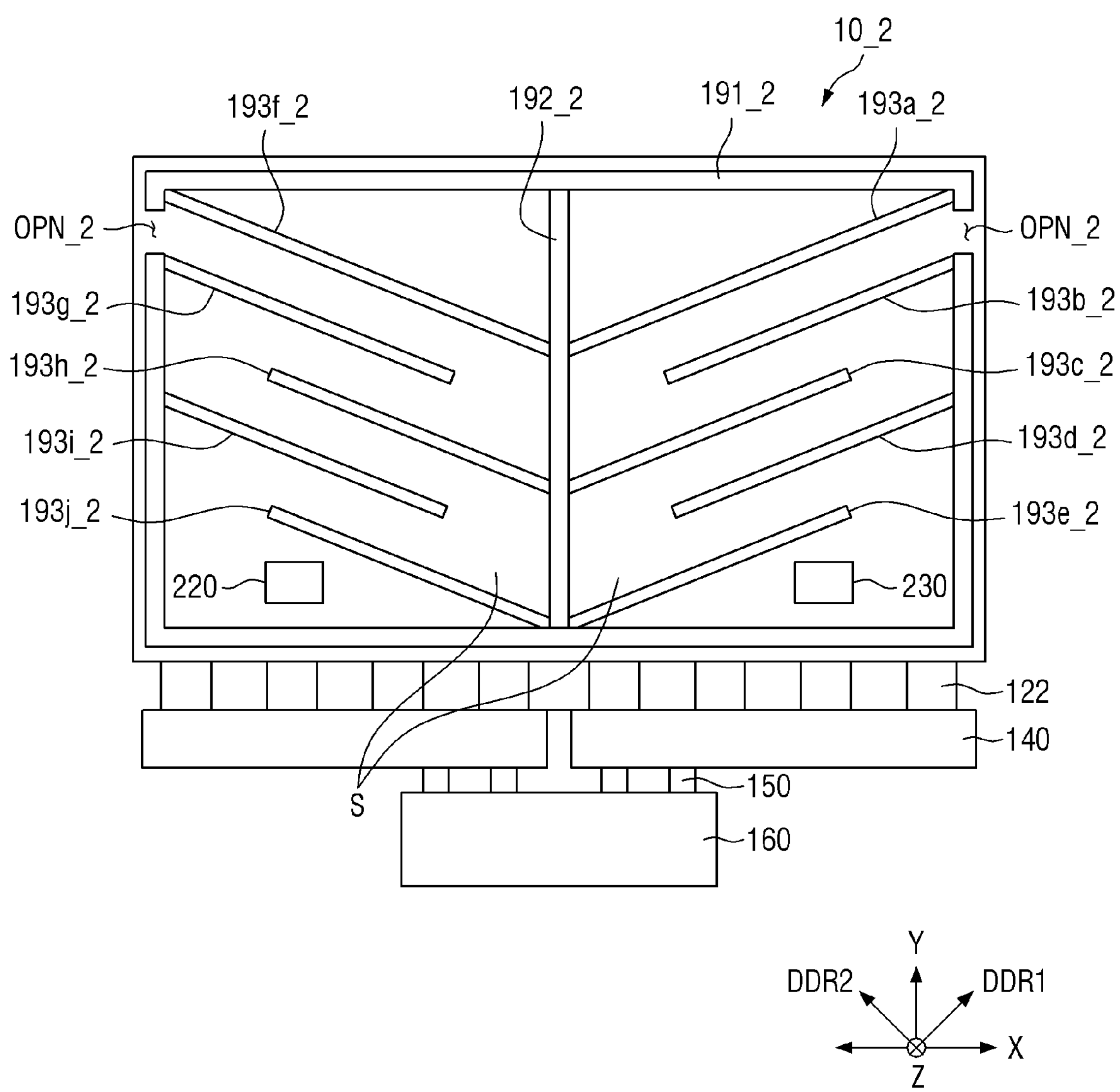
FIG. 13 is a bottom view illustrating an example of a display panel when flexible films are unfolded in FIG. 1 according to an embodiment.

FIG. 13 is a bottom view illustrating an example of a display panel 110 when flexible films are unfolded in FIG. 1 according to an embodiment.

Referring to FIGS. 1 and 13, the embodiment is different from the embodiment of FIG. 3 in the arrangement of first through third blocking members 191_2 through 193_2 and in that second and third sound generators 220 and 230 are provided. As an example, second and third sound generators 220 and 230 may be provided.

For example, the second sound generator 220 may be disposed near a side of a display panel 110, for example, near a lower left side of the display panel 110. The third sound generator 230 may be disposed near a side of the display panel 110, for example, near a lower right end of the display panel 110.

The first blocking member 191_2, the second blocking member 192_2, and the third blocking member 193_2 may block the propagation of vibrations of the display panel 110 caused by the sound generators 220 and 230 or the transmission of sound generated by the vibrations of the display panel 110. The first blocking member 191_2, the second blocking member 192_2 and the third blocking member 193_2 may be attached to one surface of a heat dissipation film 130 and a second surface of a bottom frame 180. As an example, when the heat dissipation film 130 is omitted, the first blocking member 191_2, the second blocking member 192_2, and the third blocking member 193_2 may be attached to one surface of a first substrate 111 and the second surface of the bottom frame 180.

The first blocking member 191_2 may be disposed at four edges of the heat dissipation film 130 as in FIG. 13. As illustrated in FIG. 13, the first blocking member 191_2 may include two pairs of openings OPN_2 facing each other near upper ends of left and right short sides of the display panel 110.

The second blocking member 192_2 may extend in the second direction (Y-axis direction) along a central axis of the display panel 110. Both ends of the second blocking member 192_2 may contact the first blocking member 191_2. Therefore, one empty cuboid space "S" may be formed in each of left and right areas of the display panel 110.

The third blocking member 1932 may include sub-blocking members **193*a*_2, 193*b*_2, 193*c*_2, 193*d*_2, 193*e*_2, 193*f*_2, 193*g*_2, 193*h*2, 193*i*_2 and 193*j*_2 which may generally extend in the first diagonal direction DDR1 and the second diagonal direction DDR2**.

First through fifth sub-blocking members **193*a*_2 through 193*e*_2 extending in the first diagonal direction DDR1** may be spaced apart from each other in the second direction (Y-axis direction) by a predetermined distance and may be disposed parallel to each other.

Ends of the first and second sub-blocking members **193*a*_2 and 193*b*_2 may be adjacent to an opening OPN_2 formed at an upper right side of the display panel 110, the other end of the first sub-blocking member 193*a*_2 may be connected to the second blocking member 192_2, and the other end of the second sub-blocking member 193*b*_2 may be spaced apart from the second blocking member 192_2 by a predetermined distance. Ends of the third and fifth sub-blocking members 193*c*_2 and 193*e*_2 may be connected to the second blocking member 192_2, and the other ends of the third and fifth sub-blocking members 193*c*_2 and 193*e*_2 may be spaced apart from the first blocking member 191_2 by a predetermined distance. An end of the fourth sub-blocking member 193*d*_2 may be connected to the first blocking member 191_2, and the other end of the fourth sub-blocking member 193*d*_2 may be spaced apart from the second blocking member 192_2** by a predetermined distance.

Sixth through tenth sub-blocking members **193*f*_2 through 193*j*_2 may be the same as or similar to the first through fifth sub-blocking members 193*a*_2 through 193*e*_2 except that they are symmetrical to the first through fifth sub-blocking members 193*a*_2 through 193*e*_2**, and thus a detailed description thereof is omitted.

When the second and third sound generators 220 and 230 for generating high-frequency sounds are used, it may be difficult to realize a first sound which is a low-frequency sound generated from first and fourth sound generators 210 and 240. However, in the embodiment, sub-blocking members **193*a*_2, 193*b*_2, 193*c*_2, 193*d*_2, 193*e*_2, 193*f*_2, 193*g*_2, 193*h*_2, 193*i*_2 and 193*j*_2 may form a relatively longer air duct than in the embodiments illustrated in FIGS. 3 and 12. The longer air duct may enhance bass sound emitted through the openings OPN_2 formed in the first blocking member 191_2**.

For example, a display device 10_2 may provide bass-enhanced 2.0 channel stereo sound to a user. The embodiment may be applicable to small display devices such as notebook computers and mobile terminal devices in which it may not be possible to secure a space for mounting the first and fourth sound generators 210 and 240 that may be relatively bulkier than the second and third sound generators 220 and 230.

Figure 14:
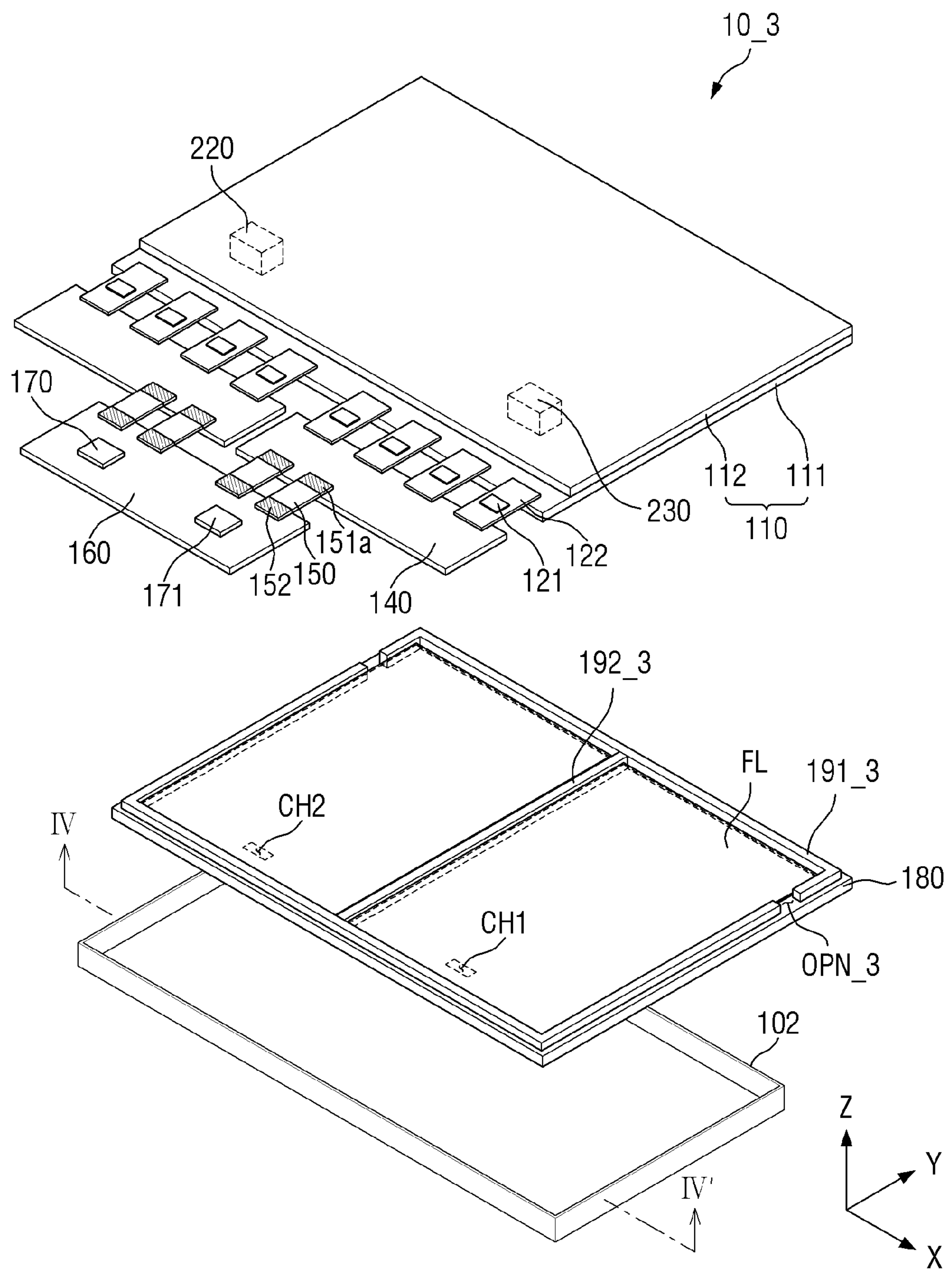
FIG. 14 is an exploded perspective view of a display device according to an embodiment.
Figure 15:
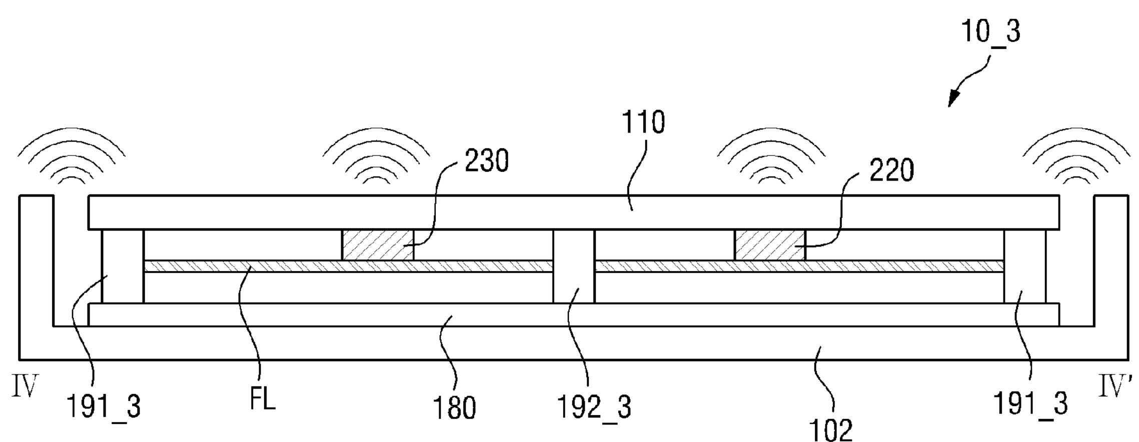
FIG. 15 is a schematic cross-sectional view of an example of IV-IV' of FIG. 14.
Figure 16:
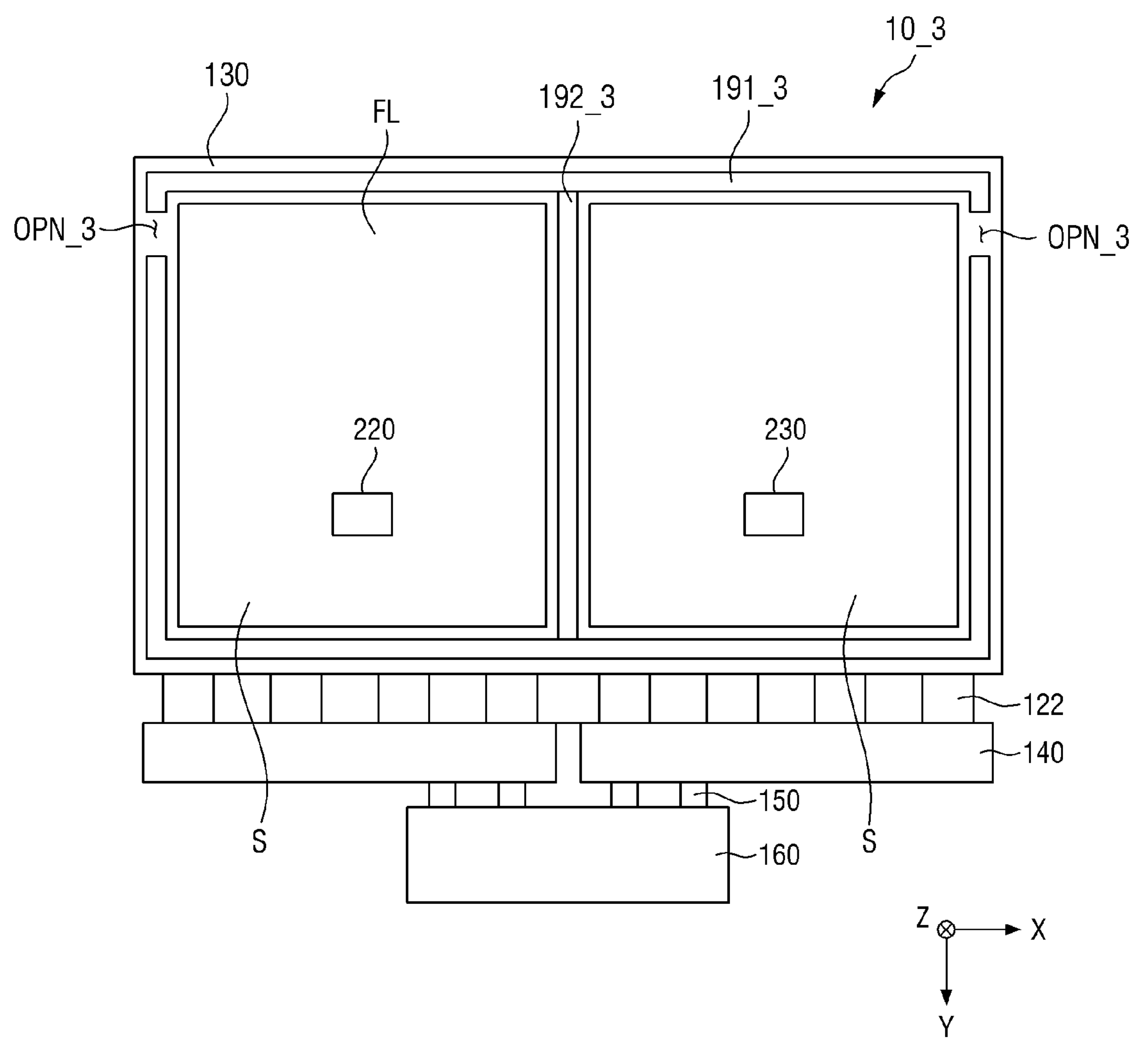
FIG. 16 is a bottom view illustrating an example of a display panel when flexible films are unfolded in FIG. 14.

FIG. 14 is an exploded perspective view of a display device 10_3 according to an embodiment. FIG. 15 is a schematic cross-sectional view of an example of IV-IV' of FIG. 14. FIG. 16 is a bottom view illustrating an example of a display panel 110 when flexible films 122 are unfolded in FIG. 14.

Referring to FIGS. 14 through 16, the embodiment is different from the embodiment of FIGS. 1 through 3 in the arrangement of blocking members 191_3 and 192_3 and in that a first sound generator 210 is not provided, and a boost film FL for bass enhancement may be provided.

For example, a second sound generator 220 may be disposed near a side of the display panel 110, for example, near a lower left side of the display panel 110. A third sound generator 230 may be disposed near a side of the display panel 110, for example, near a lower right side of the display panel 110 as in FIG. 16.

A first blocking member 191_3 and a second blocking member 192_3 may block the propagation of vibrations of the display panel 110 caused by the sound generators 220 and 230 or the transmission of sound generated by the vibrations of the display panel 110. The first blocking member 191_3 and the second blocking member 192_3 may be attached to one surface of a heat dissipation film 130 and a second surface of a bottom frame 180. As an example, when the heat dissipation film 130 is omitted, the first blocking member 191_3 and the second blocking member 192_3 may be attached to one surface of a first substrate 111 and the second surface of the bottom frame 180.

The first blocking member 191_3 may be disposed at four edges of the heat dissipation film 130 as in FIG. 16. As illustrated in FIG. 16, the first blocking member 191_3 may include one pair of openings OPN_3 facing each other near upper ends of left and right short sides of the display panel 110.

The second blocking member 192_3 may extend in the second direction (Y-axis direction) along a central axis of the display panel 110. Both ends of the second blocking member 192_3 may contact the first blocking member 191_3. Therefore, one empty cuboid space "S" may be formed in each of left and right areas of the display panel 110.

The boost film FL for bass enhancement may be provided between the display panel 110 and the bottom frame 180. The boost film FL may overlap an area, which is surrounded by the first and second blocking members 191_3 and 192_3, in the third direction (Z-axis direction).

Surfaces of the second sound generator 220 and the third sound generator 230 may be attached onto a second surface of the first substrate 111 which is opposite a first surface of the first substrate 111, and the other surfaces of the second sound generator 220 and the third sound generator 230 may be attached to one surface of the boost film FL which faces the second surface of the first substrate 111. For example, when the second and third sound generators 220 and 230 vibrate in the third direction (Z-axis direction), the display panel 110 and the boost film FL may vibrate simultaneously.

The boost film FL may be any thin film that can emit sound waves by being vibrated even by minute or subtle vibrations. For example, the boost film FL may be made of polyvinylidene fluoride (PVDF) which is a type of vinyl.

When the second and third sound generators 220 and 230 for generating high-frequency sounds are used, it may be difficult to realize a first sound which is a low-frequency sound generated from first and fourth sound generators 210 and 240. However, in the embodiment, the first sound which is a low-frequency sound may be realized using vibrations generated by the boost film FL. In other words, sound waves generated by the boost film FL may be emitted through openings OPN_3 formed in the first blocking member 191_3, thereby enhancing bass sound.

For example, the display device 10_3 may provide bass-enhanced 2.1 channel stereo sound to a user. Similar to the embodiment of FIG. 13, the embodiment may be applicable to small display devices such as notebook computers and mobile terminal devices in which it may not be possible to secure a space for mounting the first and fourth sound generators 210 and 240 that may be relatively bulkier than the second and third sound generators 220 and 230.

Figure 17:
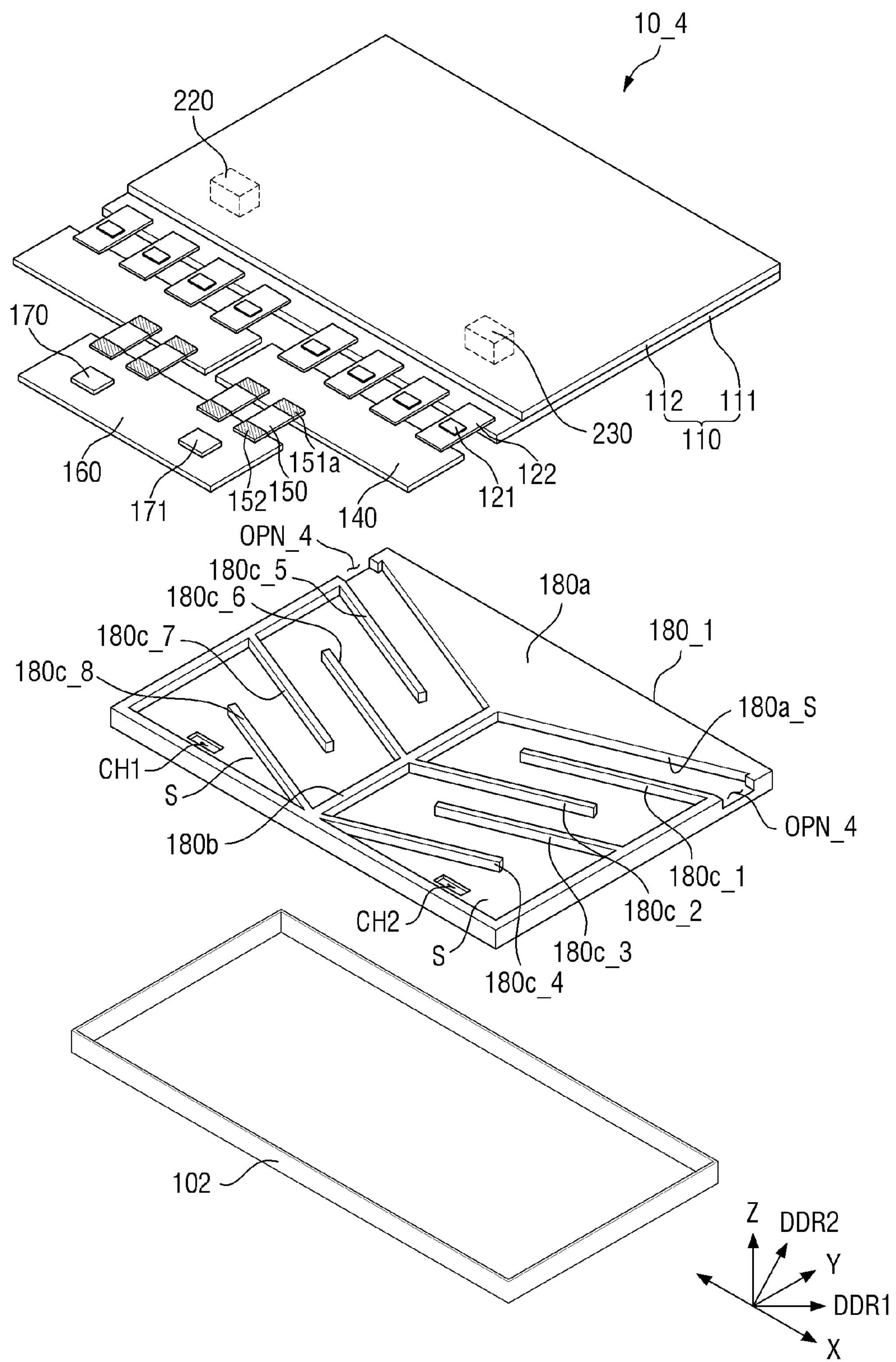
FIG. 17 is an exploded perspective view of a display device according to an embodiment.

FIG. 17 is an exploded perspective view of a display device 10_4 according to an embodiment.

Referring to FIG. 17, the embodiment is different from the embodiment of FIG. 13 in that an air duct may be formed in a bottom frame 180_1.

For example, a second sound generator 220 may be disposed near a side of a display panel 110, for example, near a lower left side of the display panel 110. A third sound generator 230 may be disposed near a side of the display panel 110, for example, near a lower right side of the display panel 110.

The bottom frame 180_1 may include a frame **180*a*, a stem 180*b*, and branches 180*c*. A thickness of the bottom frame 180_1 illustrated in FIG. 17 may be greater than that of the bottom frame 180 illustrated in FIG. 1 in the third direction (Y-axis direction). According to an embodiment, the frame 180*a*, the stem 180*b*, and the branches 180*c* may be formed by removing portions of the bottom frame 180_1. However, the frame 180*a*, the stem 180*b*, and the branches 180*c*** may also be formed using casting, for example.

The frame **180*a* of the bottom frame 180_1 may generally be disposed at four edges of the bottom frame 180_1 as in FIG. 17. As illustrated in FIG. 17, the frame 180*a* may include an inner surface 180*a*_s as extending in the first diagonal direction DDR1 and the second diagonal direction DDR2 near an upper long side of the display panel 110. The frame 180*a* may include one pair of openings OPN_4 facing each other near upper ends of left and right short sides of the display panel 110**.

The stem **180*b* may extend in the second direction (Y-axis direction) along a central axis of the display panel 110. Both ends of the stem 180*b* may contact the frame 180*a*. Therefore, one empty cuboid space "S" may be formed in each of left and right areas of the display panel 110**.

The bottom frame 180_1 may include branches **180*c*_1, 180*c*_2, 180*c*_3, 180*c*_4, 180*c*_5, 180*c*_6, 180*c*_7 and 180*c*_8 extending in the first diagonal direction DDR1 and the second diagonal direction DDR2**.

First through fourth branches **180*c*_1 through 180*c*_4 extending in the first diagonal direction DDR1** may be spaced apart from each other in the second direction (Y-axis direction) by a predetermined distance and may be disposed parallel to each other.

The inner surface **180*a*_s of the frame 180*a* and an end of the first branch 180*c*_1 may be adjacent to an opening OPN_4 formed at an upper right side of the display panel 110, and the other end of the first branch 180*c*_1 may be spaced apart from the stem 180*b*** by a predetermined distance.

Ends of the second and fourth branches **180*c*_2 and 180*c*_4 may be connected to the stem 180*b*, and the other ends of the second and fourth branches 180*c*_2 and 180*c*_4 may be spaced apart from a right side of the frame 180*a* by a predetermined distance. An end of the third branch 180$c$_3 may be connected to the right side of the frame 180$a$, and the other end of the third branch 180$c$_3 may be spaced apart from the stem 180**$b$ by a predetermined distance.

Fifth through eighth branches 180$c$_5 through 180$c$_8 may be the same as or similar to the first through fourth branches 180$c$_1 through 180$c$_4 except that they may be symmetrical to the first through fourth branches 180$c$_1 through 180$c$_4, and thus a detailed description thereof is omitted.

When the second and third sound generators 220 and 230 for generating high-frequency sounds are used, it may be difficult to realize a first sound which is a low-frequency sound generated from first and fourth sound generators 210 and 240. However, in the embodiment, branches 180$c$_1, 180$c$_2, 180$c$_3, 180$c$_4, 180$c$_5, 180$c$_6, 180$c$_7 and 180$c$_8 may form a relatively longer air duct than in the embodiments illustrated in FIGS. 3 and 12. The longer air duct may enhance bass sound emitted through the openings OPN_4 formed in the frame 180$a$.

For example, the display device 10_4 may provide bass-enhanced 2.0 channel stereo sound to a user. The embodiment may be applicable to small display devices such as notebook computers and mobile terminal devices in which it may not be possible to secure a space for mounting the first and fourth sound generators 210 and 240 that may be relatively bulkier than the second and third sound generators 220 and 230.

According to an embodiment, the bottom frame 180_1 may be metal or tempered glass. The bottom frame 180_1 may have high rigidity compared with a blocking member generally made of plastic and may have a different bass-enhancing effect from other embodiments due to a difference in the material that forms the air duct.

Although the air duct illustrated in FIG. 17 may have the same or similar shape as the air duct illustrated in FIG. 13, the air duct may be applicable according to other embodiments.

According to embodiments, it may be possible to provide a display device which may provide sufficient bass sound while minimizing displacement of a display panel due to vibrations.

While the invention has been illustrated and described with reference to the embodiments thereof, it will be apparent to those of ordinary skill in the art that various changes in form and detail may be formed thereto without departing from the spirit and scope of the invention.

What is claimed is:

1. A display device comprising:

a display panel comprising two long sides extending in a first direction and two short sides extending in a second direction;

a first sound generator disposed on a first area of one surface of the display panel, the first sound generator outputs a first sound by vibrating the display panel;

a second sound generator disposed on a second area of the one surface of the display panel, the second sound generator outputs a second sound by vibrating the display panel;

a bottom frame disposed on the one surface of the display panel;

a first blocking member disposed between the one surface of the display panel and the bottom frame and disposed along edges of the display panel; and a boost film disposed on a one surface of the first sound generator and the second sound generator facing the bottom frame, wherein the first blocking member comprises at least one opening.

2. The display device of claim 1, wherein the first and second directions intersect each other.

3. The display device of claim 1, wherein the first and second sound generators generate sounds in different frequency ranges from each other.

4. The display device of claim 3, wherein the first sound generator generates sounds in a low-frequency range and the second sound generator generates sounds in a high-frequency range.

5. The display device of claim 1, wherein the first blocking member comprises a plurality of openings, the openings are disposed at the two short sides to face each other.

6. The display device of claim 5, wherein the first sound generator comprises:

a bobbin disposed on the one surface of the display panel;

a voice coil which surrounds the bobbin; and a magnet which surrounds the bobbin and spaced apart from the bobbin.

7. The display device of claim 6, further comprising a third sound generator disposed on a third area of the one surface of the display panel, the third sound generator outputs a third sound in a higher frequency range than that of the first sound generator by vibrating the display panel.

8. The display device of claim 7, wherein each of the second sound generator and the third sound generator comprises:

a first electrode to which a first driving voltage is applied;

a second electrode to which a second driving voltage is applied; and a vibration layer disposed between the first electrode and the second electrode, the vibration layer has a piezoelectric material that contracts or expands according to the first driving voltage applied to the first electrode and the second driving voltage applied to the second electrode.

9. The display device of claim 8, further comprising a second blocking member and a third blocking member which form an air duct that guides sound waves output backward from the first through third areas of the display panel to be output to an outside of the display device through the openings.

10. The display device of claim 7, further comprising a lower set cover under the bottom frame, wherein the low-frequency sound from the first sound generator and the high-frequency sounds from the second and third sound generators are output forward from the display panel through spaces between side surfaces of the lower set cover and side surfaces of the display panel.

11. The display device of claim 9, wherein the second blocking member surrounds the first sound generator and comprises a first section which is spaced apart from an upper side of the first sound generator by a predetermined distance, a second section which is spaced apart from both sides of the first sound generator by a predetermined distance, and a third section which extends from the second section toward the openings.

12. The display device of claim 11, wherein the third blocking member extends along an extending direction of the long sides and is disposed near lower ends of the second area and the third area.

13. The display device of claim 12, wherein the second blocking member and the third blocking member are spaced apart from each other, and both ends of the third blocking member are connected to the first blocking member.

14. A display device comprising:

a display panel comprising two long sides extending in a first direction and two short sides extending in a second direction;

a first sound generator disposed on a first area of one surface of the display panel, the first sound generator outputs a first sound by vibrating the display panel;

a second sound generator disposed on a second area of the one surface of the display panel, the second sound generator outputs a second sound by vibrating the display panel;

a bottom frame disposed on the one surface of the display panel;

a first blocking member disposed between the one surface of the display panel and the bottom frame and disposed along edges of the display panel; and at least one bass enhancing thin film disposed between the display panel and the bottom frame, wherein the first blocking member comprises at least one opening.

15. The display device of claim 14, wherein the second direction intersects the first direction.

16. The display device of claim 14, wherein the second sound generator outputs a second sound in the same frequency range as the first sound generator.

17. The display device of claim 14, wherein the first sound generator and the second sound generator generate sounds in a low-frequency range.

18. The display device of claim 17, wherein each of the first sound generator and the second sound generator comprises:

a first electrode to which a first driving voltage is applied;

a second electrode to which a second driving voltage is applied; and a vibration layer disposed between the first electrode and the second electrode and the vibration layer has a piezoelectric material that contracts or expands according to the first driving voltage applied to the first electrode and the second driving voltage applied to the second electrode.

19. The display device of claim 18, wherein one surface of the first and second sound generators is attached to the one surface of the display panel, and the other surface of the first and second sound generators is attached to one surface of the bass enhancing thin-film.

20. The display device of claim 19, wherein the other surface of the bass enhancing thin film which is opposite the one surface attached to the other surfaces of the first and second sound generators is spaced apart from the bottom frame in a thickness direction.

21. The display device of claim 20, wherein the bass enhancing thin film is made of polyvinylidene fluoride (PVDF).

22. The display device of claim 21, further comprising a second blocking member and a third blocking member that form an air duct that guides sound waves output backward from the first and second areas of the display panel to be output to an outside of the display device through the at least one opening.

23. The display device of claim 22, wherein the second blocking member is disposed in the middle of the display panel in an extending direction of the long sides and extends in an extending direction of the short sides.

24. The display device of claim 23, wherein the third blocking member comprises a plurality of sub-blocking members arranged at regular intervals in the extending direction of the short sides, wherein the sub-blocking members extend in a first diagonal direction and a second diagonal direction which are directions between the extending direction of the short sides and the extending direction of the long sides.

25. The display device of claim 24, wherein first through fifth sub-blocking members extend in the first diagonal direction, and sixth through tenth sub-blocking members extend in the second diagonal direction.

26. The display device of claim 25, wherein an end of the first, second, third, fourth, fifth, sixth, seventh, eighth, ninth, and tenth sub-blocking member is connected to the second blocking member, another end of the first, second, third, fourth, fifth, sixth, seventh, eighth, ninth, and tenth sub-blocking member is spaced apart from the first blocking member, and ends of either of the first, second, third, fourth, fifth, sixth, seventh, eighth, ninth, or tenth sub-blocking member are adjacent to the opening.

27. The display device of claim 24, wherein first through fifth sub-blocking members extend in the first diagonal direction, sixth through tenth sub-blocking members extend in the second diagonal direction, one ends of the first sub-blocking member and the second sub-blocking members are adjacent to the opening, the other end of the first sub-blocking member is connected to the second blocking member, the other end of the second sub-blocking member is spaced apart from the second blocking member, one end of the third sub-blocking member is connected to the second blocking member, the other end of the third sub-blocking member is spaced apart from the first blocking member, one end of the fourth sub-blocking member is connected to the first blocking member, the other end of the fourth sub-blocking member is spaced apart from the second blocking member, one end of the fifth sub-blocking member is connected to the second blocking member, the other end of the fifth sub-blocking member is spaced apart from the first blocking member, one ends of the sixth sub-blocking member and the seventh sub-blocking member are adjacent to the opening, the other end of the sixth sub-blocking member is connected to the second blocking member, the other end of the seventh sub-blocking member is spaced apart from the second blocking member, one end of the eighth sub-blocking member is connected to the second blocking member, the other end of the eighth sub-blocking member is spaced apart from the first blocking member, one end of the ninth sub-blocking member is connected to the first blocking member, the other end of the ninth sub-blocking member is spaced apart from the second blocking member, one end of the tenth sub-blocking member is connected to the second blocking member, and the other end of the tenth sub-blocking member is spaced apart from the first blocking member.

* * * * *